United States Patent
Annamalai et al.

(10) Patent No.: US 8,761,761 B2
(45) Date of Patent: Jun. 24, 2014

(54) LOCATION CONTINUITY SERVICE FOR LOCATING MOBILE DEVICES USING MULTIPLE ACCESS NETWORKS INCLUDING WIRELESS TELECOMMUNICATION NETWORKS

(71) Applicant: T-Mobile USA, Inc., Bellevue, WA (US)

(72) Inventors: Magesh Annamalai, Renton, WA (US); Gamze Seckin, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/900,440

(22) Filed: May 22, 2013

(65) Prior Publication Data

US 2013/0260749 A1    Oct. 3, 2013

Related U.S. Application Data

(62) Division of application No. 12/769,524, filed on Apr. 28, 2010, now Pat. No. 8,472,974.

(51) Int. Cl.
*H04W 8/02*    (2009.01)

(52) U.S. Cl.
USPC ..................................... 455/432.2

(58) Field of Classification Search
USPC ........... 455/433, 436, 456.2, 414.1, 411, 439;
370/352, 389, 400, 410
See application file for complete search history.

(56) References Cited

U.S. PATENT DOCUMENTS

| | | | |
|---|---|---|---|
| 5,724,660 A | 3/1998 | Kauser et al. | |
| 6,002,679 A | 12/1999 | Liu et al. | |
| 6,104,712 A | 8/2000 | Robert et al. | |
| 6,119,012 A | 9/2000 | Amirijoo | |
| 6,222,483 B1 | 4/2001 | Twitchell et al. | |
| 6,249,252 B1 | 6/2001 | Dupray | |

(Continued)

FOREIGN PATENT DOCUMENTS

| | | |
|---|---|---|
| EP | 2051556 A1 | 4/2009 |
| EP | 2173131 A1 | 4/2010 |

(Continued)

OTHER PUBLICATIONS

"Enabler Release Definition for Secure UserPlane for Location," Candidate Version 1.0, Open Mobile Alliance, Jan. 22, 2007, 17 pages.

(Continued)

*Primary Examiner* — Melody Mehrpour
(74) *Attorney, Agent, or Firm* — Perkins Coie LLP

(57) ABSTRACT

A location continuity service having a location continuity application server ("LCAS") that utilizes location data generated by multiple networks to determine the location of a mobile device is disclosed. The LCAS specifies a suitable reconciliation process that identifies two or more location estimation techniques that are implemented by different access networks and indicates how to utilize the location data produced by the identified estimation techniques. The LCAS interacts with various access networks identified by the reconciliation process in order to receive location data (e.g., positioning measurements and/or estimated locations) generated by the access networks and analyzes the received data to determine the location of a mobile device and provide the determined location to a location-based service. In some examples, an LCAS also provides location continuity when a mobile device moves between a home communications system and a visited communications system.

24 Claims, 9 Drawing Sheets

(56) References Cited

U.S. PATENT DOCUMENTS

| | | |
|---|---|---|
| 6,252,545 B1 | 6/2001 | Da et al. |
| 6,463,288 B1 | 10/2002 | Havinis et al. |
| 6,603,976 B1 | 8/2003 | Amirijoo et al. |
| 6,665,611 B1 | 12/2003 | Oran et al. |
| 6,671,514 B1 | 12/2003 | Cedervall et al. |
| 6,690,659 B1 | 2/2004 | Ahmed et al. |
| 6,801,778 B2 | 10/2004 | Koorapaty et al. |
| 6,952,181 B2 | 10/2005 | Karr et al. |
| 7,151,941 B2 | 12/2006 | Vanttinen et al. |
| 7,177,399 B2 | 2/2007 | Dawson et al. |
| 7,194,354 B1 | 3/2007 | Oran et al. |
| 7,245,900 B1 | 7/2007 | Lamb et al. |
| 7,272,500 B1 | 9/2007 | Walker |
| 7,283,822 B2 | 10/2007 | Gallagher et al. |
| 7,313,143 B1 | 12/2007 | Bruno |
| 7,317,910 B2 | 1/2008 | Niemenmaa et al. |
| 7,336,962 B2 | 2/2008 | Levitan |
| 7,353,034 B2 | 4/2008 | Haney |
| 7,369,859 B2 | 5/2008 | Gallagher |
| 7,433,673 B1 | 10/2008 | Everson et al. |
| 7,436,789 B2 | 10/2008 | Caliskan et al. |
| 7,466,986 B2 | 12/2008 | Halcrow et al. |
| 7,593,605 B2 | 9/2009 | King et al. |
| 7,606,555 B2 | 10/2009 | Walsh et al. |
| 7,610,011 B2 | 10/2009 | Albrett |
| 7,620,404 B2 | 11/2009 | Chesnais et al. |
| 7,640,008 B2 | 12/2009 | Gallagher et al. |
| 7,676,394 B2 | 3/2010 | Ramer et al. |
| 7,714,778 B2 | 5/2010 | Dupray |
| 7,768,963 B2 | 8/2010 | Alizadeh-Shabdiz |
| 7,903,029 B2 | 3/2011 | Dupray |
| 7,904,096 B2 | 3/2011 | Shyr et al. |
| 8,116,291 B2 | 2/2012 | Annamalai et al. |
| 8,145,183 B2 | 3/2012 | Barbeau et al. |
| 8,320,931 B2* | 11/2012 | Ward et al. .................. 455/456.1 |
| 8,364,746 B2 | 1/2013 | Annamalai et al. |
| 8,369,266 B2 | 2/2013 | Jin et al. |
| 8,396,458 B2* | 3/2013 | Raleigh ...................... 455/414.1 |
| 8,472,974 B2 | 6/2013 | Annamalai et al. |
| 2002/0064141 A1 | 5/2002 | Sakakura |
| 2002/0077144 A1 | 6/2002 | Keller et al. |
| 2002/0123354 A1* | 9/2002 | Nowak .......................... 455/456 |
| 2002/0151305 A1* | 10/2002 | Ward et al. .................... 455/436 |
| 2003/0016648 A1 | 1/2003 | Lindsay et al. |
| 2003/0095069 A1 | 5/2003 | Stilp |
| 2003/0096622 A1 | 5/2003 | Moilanen |
| 2003/0134648 A1 | 7/2003 | Reed et al. |
| 2003/0139182 A1 | 7/2003 | Bakkeby et al. |
| 2003/0148774 A1 | 8/2003 | Naghian et al. |
| 2003/0216143 A1 | 11/2003 | Roese et al. |
| 2004/0087315 A1 | 5/2004 | Dufva et al. |
| 2004/0102196 A1 | 5/2004 | Weckstrom et al. |
| 2004/0142704 A1 | 7/2004 | Scholz |
| 2004/0157590 A1 | 8/2004 | Lazaridis et al. |
| 2004/0162896 A1 | 8/2004 | Cen et al. |
| 2004/0166856 A1 | 8/2004 | Niemenmaa |
| 2004/0198386 A1 | 10/2004 | Dupray |
| 2004/0202120 A1 | 10/2004 | Hanson |
| 2004/0203853 A1 | 10/2004 | Sheynblat |
| 2004/0203915 A1 | 10/2004 | van Diggelen et al. |
| 2004/0224702 A1 | 11/2004 | Chaskar |
| 2005/0003831 A1 | 1/2005 | Anderson |
| 2005/0059415 A1 | 3/2005 | Easo et al. |
| 2005/0066044 A1 | 3/2005 | Chaskar et al. |
| 2005/0075116 A1 | 4/2005 | Laird et al. |
| 2005/0079821 A1 | 4/2005 | Bi |
| 2005/0130673 A1 | 6/2005 | Annamalai |
| 2005/0136943 A1 | 6/2005 | Banerjee et al. |
| 2005/0138144 A1 | 6/2005 | Sethi |
| 2005/0148342 A1 | 7/2005 | Sylvain |
| 2005/0153687 A1 | 7/2005 | Niemenmaa et al. |
| 2005/0170851 A1 | 8/2005 | Melpignano et al. |
| 2005/0181805 A1 | 8/2005 | Gallagher |
| 2005/0186948 A1 | 8/2005 | Gallagher et al. |
| 2005/0192024 A1 | 9/2005 | Sheynblat |
| 2005/0286466 A1 | 12/2005 | Tagg et al. |
| 2006/0014517 A1 | 1/2006 | Barclay et al. |
| 2006/0014548 A1 | 1/2006 | Bolin et al. |
| 2006/0015513 A1 | 1/2006 | Poyhonen et al. |
| 2006/0025158 A1 | 2/2006 | Leblanc et al. |
| 2006/0029296 A1 | 2/2006 | King et al. |
| 2006/0052115 A1 | 3/2006 | Khushu |
| 2006/0062363 A1 | 3/2006 | Albrett |
| 2006/0098899 A1 | 5/2006 | King et al. |
| 2006/0172732 A1 | 8/2006 | Nylander et al. |
| 2006/0178146 A1 | 8/2006 | Lee et al. |
| 2006/0194594 A1 | 8/2006 | Ruutu et al. |
| 2006/0258365 A1 | 11/2006 | Cha et al. |
| 2006/0276201 A1 | 12/2006 | Dupray |
| 2006/0286984 A1 | 12/2006 | Bonner |
| 2007/0060114 A1 | 3/2007 | Ramer et al. |
| 2007/0061198 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061303 A1 | 3/2007 | Ramer et al. |
| 2007/0061317 A1 | 3/2007 | Ramer et al. |
| 2007/0072624 A1 | 3/2007 | Niemenmaa et al. |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0087750 A1* | 4/2007 | Uchida ......................... 455/436 |
| 2007/0123237 A1 | 5/2007 | Cacioppo et al. |
| 2007/0149213 A1* | 6/2007 | Lamba et al. ............... 455/456.1 |
| 2007/0155489 A1 | 7/2007 | Beckley et al. |
| 2007/0167174 A1 | 7/2007 | Halcrow et al. |
| 2007/0178913 A1 | 8/2007 | Niemenmaa et al. |
| 2007/0189497 A1 | 8/2007 | Bareis |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0239724 A1 | 10/2007 | Ramer et al. |
| 2007/0288427 A1 | 12/2007 | Ramer et al. |
| 2008/0009268 A1 | 1/2008 | Ramer et al. |
| 2008/0014956 A1 | 1/2008 | Balasubramanian |
| 2008/0045236 A1 | 2/2008 | Nahon et al. |
| 2008/0076420 A1 | 3/2008 | Khetawat et al. |
| 2008/0076429 A1 | 3/2008 | Comstock et al. |
| 2008/0081620 A1 | 4/2008 | Lu et al. |
| 2008/0096594 A1 | 4/2008 | Vinding |
| 2008/0108319 A1 | 5/2008 | Gallagher |
| 2008/0146245 A1 | 6/2008 | Appaji |
| 2008/0192696 A1 | 8/2008 | Sachs et al. |
| 2008/0280624 A1 | 11/2008 | Wrappe |
| 2009/0185669 A1 | 7/2009 | Zitnik et al. |
| 2009/0270099 A1* | 10/2009 | Gallagher et al. .......... 455/435.1 |
| 2009/0275348 A1 | 11/2009 | Weinreich et al. |
| 2009/0311987 A1 | 12/2009 | Edge et al. |
| 2010/0069099 A1 | 3/2010 | Dunn et al. |
| 2010/0289640 A1 | 11/2010 | Annamalai |
| 2010/0291947 A1 | 11/2010 | Annamalai |
| 2010/0331017 A1 | 12/2010 | Ariga |
| 2011/0039576 A1 | 2/2011 | Prakash et al. |
| 2011/0047033 A1 | 2/2011 | Mahaffey et al. |
| 2011/0051665 A1 | 3/2011 | Huang |
| 2011/0200022 A1 | 8/2011 | Annamalai |
| 2012/0140749 A1 | 6/2012 | Caldwell et al. |
| 2012/0320888 A1 | 12/2012 | Annamalai et al. |
| 2013/0150085 A1 | 6/2013 | Jin et al. |

FOREIGN PATENT DOCUMENTS

| | | |
|---|---|---|
| JP | 10239416 A | 9/1998 |
| KR | 1020040034571 | 4/2004 |
| KR | 20050031338 A | 4/2005 |
| KR | 1020060025111 | 3/2006 |
| KR | 20070088455 A | 8/2007 |

(56) References Cited

FOREIGN PATENT DOCUMENTS

| WO | WO-0027143 | 5/2000 |
|----|------------|--------|
| WO | WO-2005004528 | 1/2005 |
| WO | WO-2011139841 | 11/2011 |

OTHER PUBLICATIONS

"Google Search of Location of Mobile," http://www.google.com/search?q=location+of+mibile&sourceid=ie7&rls=com.microsoft:en-us:IE-SearchBox&ie=&oe= [Last Accessed Jun. 8, 2010], 2 pages.

"IP Multimedia Subsystem," Wikipedia, http://wikipedia.org/wiki/IP_Multimedia_Subsystem, 13 pages [Last Accessed May 5, 2010].

"Secure User Plane for Location Requirements," Candidate Version 1.0, Open Mobile Alliance, Jun. 16, 2006, 80 pages.

"Secure UserPlane for Location Architecture," Candidate Version 1.0, Open Mobile Alliance, Jan. 22, 2007, 80 pages.

"The 3GPP Standard for Convergence-Diagram," UMA Universal Mobile Access, http://www.umatoday.com/img/diagrams/umaServices.jpg, [First Accessed Oct. 17, 2007], 1 page.

"The 3GPP Standard for Convergence-Dual Mode Handsets," UMA Universal Mobile Access, UMA Today, 2007, 2 pages.

"The 3GPP Standard for Convergence-Femtocells," UMA Universal Mobile Access, UMA Today, 2007, 2 pages.

"The 3GPP Standard for Convergence-Softmobiles," UMA Universal Mobile Access, UMA Today, 2007, 2 pages.

"The 3GPP Standard for Convergence-Terminal Adaptors," UMA Universal Mobile Access, UMA Today, 2007, 2 pages.

"UserPlane for Location Protocol," Candidate Version 1.0, Open Mobile Alliance, Jan. 22, 2007, 56 pages.

Annamalai, Magesh, "Method and Delivery of UMA Value Added Location Services Via SUPL," U.S. Appl. No. 60/853,086, filed Oct. 20, 2006, 15 pages.

Dyoub, J. et al., "Dueling Architectures: Control plane vs. User-plane," HP invent, 2004, 2 pages.

Gum, Arnold et al., "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.

International Search Report and Written Opinion, International Application No. PCT/US2007/82133, Applicant: T-Mobile USA, Inc., Flied on Oct. 22, 2007, Date Mailed on Apr. 29, 2008, 9 pages.

International Search Report and Written Opinion, International Application No. PCT/2006/41226, Filed on Oct. 20, 2006, Applicant: T-Mobile USA, Inc., Date of Mailing: Dec. 4, 2007, 18 pages.

International Search Report and Written Opinion, International Application No. PCT/2007/82156, Filed on Oct. 22, 2007, Applicant: T-Mobile USA, Inc., Date of Mailing: May 28, 2008, 12 pages.

International Search Report and Written Opinion, International Application No. PCT/US2007/66579, Filed on Apr. 12, 2007, Applicant: T-Mobile, Inc., Date of Mailing Sep. 9, 2008, 9 pages.

International Search Report and Written Opinion, International Application No. PCT/US2007/82136, Applicant: T-Mobile USA, Inc., Flied on Oct. 22, 2007, Date Mailed on Mar. 11, 2008, 11 pages.

Raja, K., et al., "We Know," IEEE Communication Engineer, Jun./Jul. 2004, 6 pages.

Spinney, Jonathan, "Wireless Location Uses in the User Plane and Control Plane," The Location Based Services Community, Jun. 27, 2005, 3 pages.

International Search Report and Written Opinion, International Application No. PCT/US2010/035010, Applicant: T-Mobile USA, Inc., Flied on May 14, 2010, Date Mailed on Dec. 22, 2010, 10 pages.

International Search Report and Written Opinion, International Application No. PCT/US2010/035014, Applicant: T-Mobile USA, Inc., Flied on May 14, 2010, Date Mailed on Dec. 28, 2010, 11 pages.

Martin-Escalona, et al., "Delivery of Non-Standardized Assistance Data in E-OTD/GNSS Hybrid Location Systems," IEEE 2002, pp. 1-5.

Steinfield, "The Development of Location Based Services in Mobile Commerce," Elife after the dot.com bust, Berlin, Springer, 2004, pp. 1-15.

International Search Report and Written Opinion, International Application No. PCT/US2011/034344, Applicant: T-Mobile USA, Inc., mailed Dec. 7, 2011, 13 pages.

Extended European Search Report, EP Patent Application 07760606.9, mailed Jan. 23, 2013, 8 pages.

Schulzrinne et al. "Emergency Services for Internet Telephony Systems," Oct. 18, 2004, Network Working Group, Internet Draft, pp. 1-20.

* cited by examiner

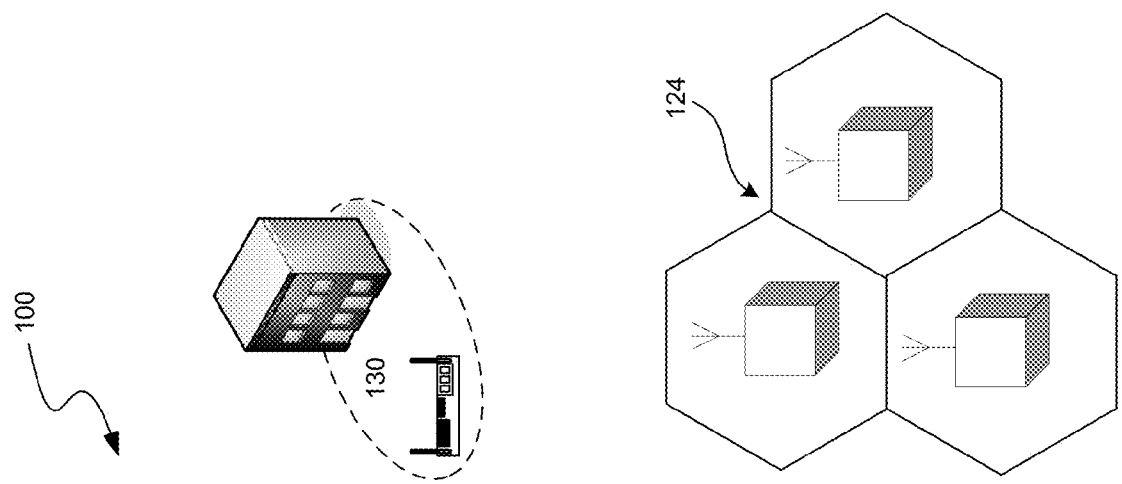
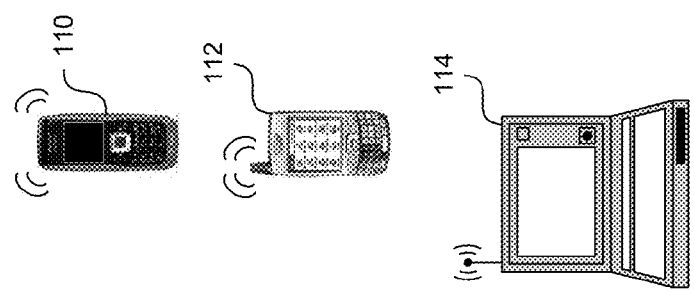
*FIG. 1*
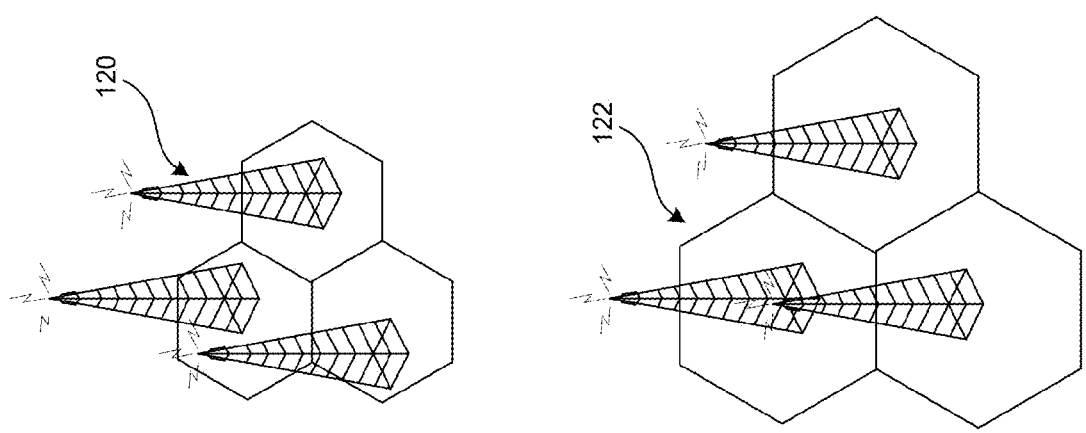

| | 505 | 510 | 515 | 520 | 525 | 530 | 535 | 540 | 565 |
|---|---|---|---|---|---|---|---|---|---|
| | Session ID | Device ID | Determined Location: Process H1 | Determined Location: Process H2 | Location Data: Network 1 Method 1 | Location Data: Network 1 Method 2 | Location Data: Network 2 Method 2 | Location Data: Network 3 Method 3 | |
| | A3F1 | LL13 | F1[L1[t]-Ln[t]] | F1'[L1[t]-Ln[t]] | L1[t] | L2[t] | L3[t] | L4[t] | ... |
| | A3F1 | DJ82 | F2[L1[t]-Ln[t]] | F2'[L1[t]-Ln[t]] | NULL | L5[t] | L6[t] | L7[t] | ... |
| | G2K1 | A6N5 | F3[L1[t]-Ln[t]] | F3'[L1[t]-Ln[t]] | L8[t] | NULL | L9[t] | NULL | ... |
| | KLA1 | DMJ20 | F4[L1[t]-Ln[t]] | NULL | L10[t] | L11[t] | L12[t] | L13[t] | ... |
| | ... | ... | ... | ... | ... | ... | ... | ... | ... |

LOCATION CONTINUITY SERVICE FOR LOCATING MOBILE DEVICES USING MULTIPLE ACCESS NETWORKS INCLUDING WIRELESS TELECOMMUNICATION NETWORKS

CROSS-REFERENCES TO RELATED APPLICATIONS

This application is a divisional application of U.S. patent application Ser. No. 12/769,524, filed on Apr. 28, 2010, and entitled "LOCATION CONTINUITY SERVICE FOR LOCATING MOBILE DEVICES USING MULTIPLE ACCESS NETWORKS INCLUDING WIRELESS TELECOMMUNICATION NETWORKS," which is hereby incorporated herein in its entirety by reference.

BACKGROUND

The popularity of location-based services has substantially increased in recent years. For example, mobile device users now employ location-based services for navigation, to perform location-based searching, to receive location-based alerts or advertising, to search for or receive notification of nearby acquaintances, and/or the like. Likewise, other parties (e.g., network operators, third-party location-based service providers, remote telemetry users, advertisers, etc.) may employ location-based services to enable emergency services (e.g., E911 services), enable asset tracking or recovery services, provide location-based alerts or advertising, provide notification of nearby acquaintances, perform network registration or billing, and/or the like. The recent increase in the popularity of location-based services has led to the development of many different location determination techniques for mobile devices. Certain location determination techniques may be suitable only for certain kinds of mobile devices and/or certain kinds of radio access networks.

Many different types of radio access networks have been deployed to facilitate radio transmissions to and from mobile devices. As a result, at a single geographic location, a mobile device user may be able to connect to more than one type of radio access network. For example, standing on a street corner, a mobile device user may be able to connect simultaneously to a Global System for Mobile Communications ("GSM") network and a Worldwide Interoperability for Microwave Access ("WiMAX") network. In addition, at any single geographic location a mobile device user may be able to access a hard-wired access network, such as a cable network or a landline phone network. Thus, at a certain time point, a mobile device may be located by more than one location determination technique using one or more wired or wireless access networks. For example, at a particular time, a mobile device may be located by a technique suitable for GSM networks (e.g., Uplink Time Difference of Arrival ("U-TDOA") techniques) and a technique suitable for WiMAX networks (e.g., Assisted Global Positioning System ("AGPS") techniques).

As a mobile device user moves, the types of available access networks may also change. For example, during the first part of a session, which may include a voice, data, multimedia, location and/or messaging session, a mobile device may only be in range of a GSM network but after its user moves, the device may only be able to access a WiMAX network. Thus, during a single session (e.g., a single voice call) on a mobile device, the location determination techniques available to locate that mobile device may change.

BRIEF DESCRIPTION OF THE DRAWINGS

FIG. 1 is a diagram of a representative environment in which a location continuity service operates.

FIG. 5 shows a table that conceptually illustrates how a location continuity application server stores location data.

DETAILED DESCRIPTION

Figure 2:
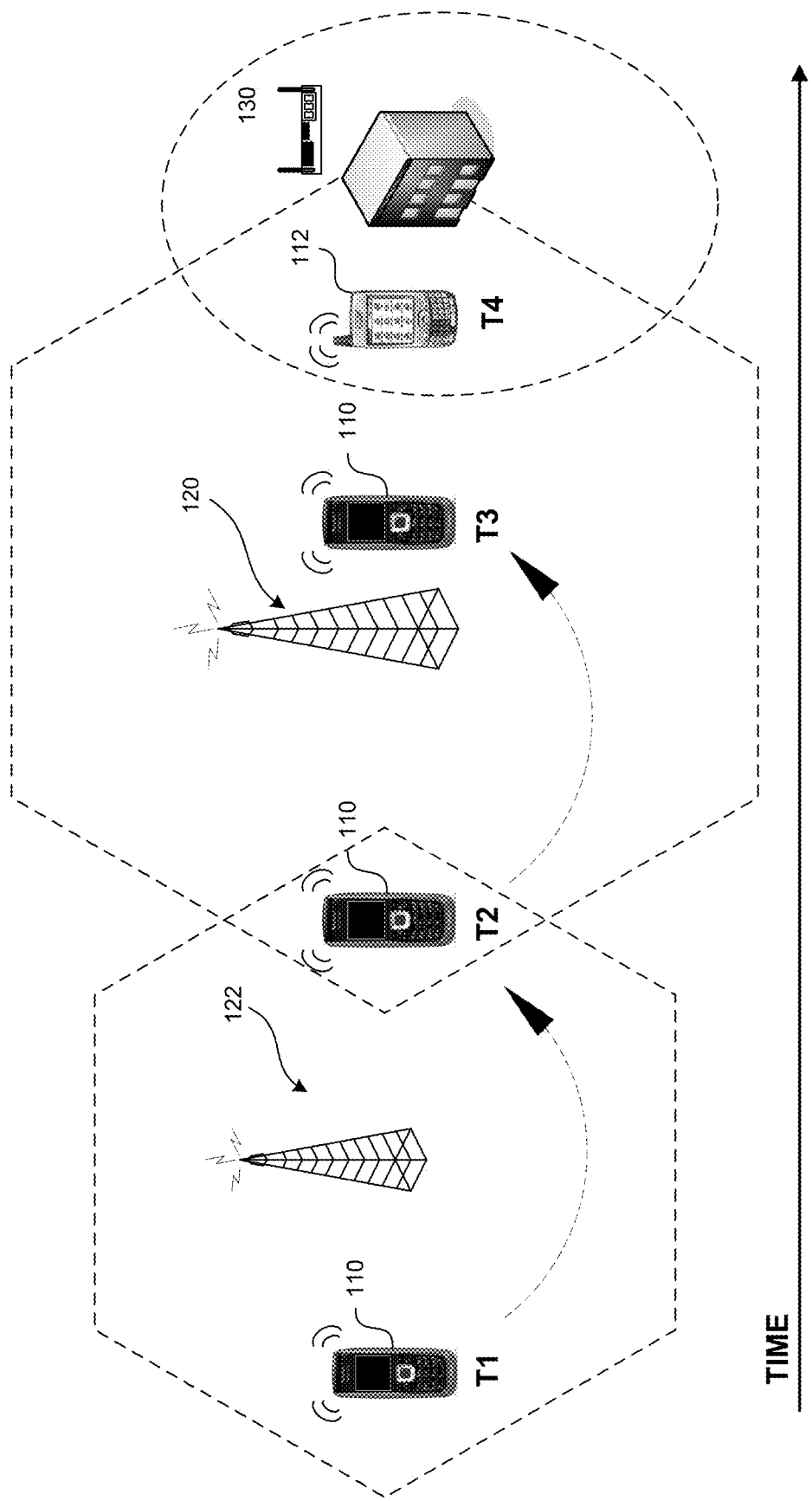
FIG. 2 is a diagram illustrating an example use case where position continuity and location continuity are maintained across networks and mobile devices by the location continuity service during a session.

Described herein is a location continuity service having a location continuity application server ("LCAS") that utilizes location data generated by multiple access networks, to determine the location of a mobile device. Responsive to a service request for a location of a mobile device, the LCAS specifies a suitable reconciliation process that identifies two or more location estimation techniques that are implemented by different access networks and indicates how to utilize the location data produced by two or more identified estimation techniques. In accordance with the applied reconciliation process, the LCAS interacts with various access networks identified by the process in order to receive location data generated by the access networks, including positioning measurements and/or estimated locations. The LCAS analyzes the received location data to determine the location of a mobile device and provide the determined location to a location-based service.

In some examples, an LCAS also provides improved location continuity when a mobile device moves between a home communications system and a visited communications system. In one example, when a mobile device moves from a home communications system to a visited communications system, a home LCAS associated with the home communications system provides determined location information to a visited LCAS associated with the visited communications system. In another example, when a mobile device moves from a visited communications system to a home communications system, a home LCAS requests and receives determined location information from a visited LCAS.

Typical location estimation or determination techniques implemented by radio access networks include Time Difference on Arrival ("TDOA") (including Uplink-TDOA (U-TDOA), Observed TDOA ("OTDOA"), Ideal Period Downlink-OTDOA ("IPDL-OTDOA"), and other TDOA procedures), Cell Identification ("CI"), CI plus Timing Advance ("CI-TA"), use of a Global Positioning System ("GPS"), use of an Assisted Global Positioning System ("AGPS"), Assisted Global Navigation Satellite System ("AGNSS"), Round Trip Time ("RTT") measurements, CI plus RTT ("CI-RTT"), Enhanced Observed Time Difference ("E-OTD"), WiFI Data Base location, triangulation, and/or the like. Some of these location estimation techniques determine or estimate the location of a mobile device using available information, such as an identifier of a cell, femtocell, picocell, access point, base station, Node-B, eNode-B, cell site, and/or other network component or network that is accessible to the mobile device. Suitable identifiers include an Internet Protocol ("IP") address, a Cell Global Identity ("CGI"), an Enhanced CGI ("E-CGI"), a Media Access Control ("MAC") address, a Service Set Identifier ("SSID"), an International Mobile Subscriber Identity ("IMSI"), an International Mobile Equipment Identity ("IMEI"), a serial number, and/or the like. Suitable examples of determining or estimating the location of a mobile device according to an identifier or other technique are described in International Patent Application PCT/US2007/066579, entitled "Mobile Computing Device Geographical Location Determination," which was filed on Apr. 12, 2007; International Patent Application PCT/US2006/041226, entitled "System and Method for Determining Device Location in an IP-Based Wireless Telecommunications System," which was filed on Oct. 20, 2006; International Patent Application PCT/US2007/082136, entitled "System and Method for Utilizing IP-Based Wireless Telecommunications Client Location Data," which was filed on Oct. 22, 2006; and International Patent Application PCT/US2007/082133, entitled "Two Stage Mobile Device Geographical Location Determination," which was filed on Oct. 22, 2006; all of which are hereby incorporated by reference in their entirety.

A location continuity service having an LCAS may be employed to facilitate the provisioning of location-based services to mobile device users, emergency services users, network operators, remote telemetry users, and others. The use of an LCAS enables service providers to provide better position continuity and location continuity as a mobile device utilizes various access networks to improve the overall end-user experience and to provide a rich communication service to an end-user. An LCAS may also permit service providers to locate a mobile device more accurately and/or more quickly while utilizing fewer system resources and/or incurring lower costs.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Illustrative Environments

FIG. 1 illustrates a representative environment 100 in which the location continuity service may operate. Environment 100 includes mobile devices 110, 112, and 114 and wireless or wired networks 120, 122, 124, and 130. Mobile devices 110, 112, and 114 are configured to communicate with, or through, one or more of networks 120, 122, 124, and 130. Although mobile devices by their nature will typically connect via a wireless network, under certain circumstances mobile devices may connect via a wired network.

Mobile devices 110, 112, and 114 may include virtually any devices for communicating over a wireless network. Such devices include mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants (PDAs), radio frequency devices, infrared devices, handheld computers, laptop computers, wearable computers, tablet computers, pagers, integrated devices combining one or more of the preceding devices, and/or the like. As such, mobile devices 110, 112, and 114 may range widely in terms of capabilities and features. For example, a mobile telephone may have a numeric keypad, the capability to display only a few lines of text and be configured to interoperate with only GSM networks. However, other mobile devices (e.g., smart phones) may have a touch-sensitive screen, a stylus, an embedded GPS receiver, and a relatively high-resolution display and be configured to interoperate with multiple types of networks. Mobile devices 110, 112, and 114 may also include SIM-less devices (i.e., mobile devices that do not contain a functional subscriber identity module ("SIM")), roaming mobile devices (i.e., mobile devices operating outside of their home access networks), and/or mobile software applications.

Users may employ mobile devices 110, 112, and 114 to communicate with other users or devices. In addition, users may employ mobile devices 110, 112, and 114 to receive, provide, or otherwise interact with location-based services such as emergency services (e.g., E911), asset tracking or recovery services, location-based alerts or advertising services, social networking services such as identification of nearby friends and family, and/or the like. Additionally, network operators may utilize location-based services to perform network registration of a mobile device 110, 112, 114 or billing/charging for mobile device services. Location-based services may be initiated via network components or via the mobile device.

Mobile devices 110, 112, and 114 typically include a processing unit, volatile memory and/or nonvolatile memory, a power supply, one or more network interfaces, an audio interface, a display, a keypad or keyboard, a GPS receiver and/or other location determination component, and other input and/or output interfaces. The various components of mobile devices 110, 112, and 114 may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. In addition, the memories may be employed to store operational data, content, contexts, and/or the like. The memories may also store one or more applications configured to receive and/or provide messages to and/or from another device or component. These messages may also be displayed and/or stored on mobile device 110, 112, or 114. Such messages may include short message service (SMS) messages, multi-media message service (MMS) messages, instant messaging (IM) messages, enhanced message service (EMS) messages, rich communication service content, and/or any other content directed toward a user of mobile devices 110, 112, or 114. The memories of mobile devices 110, 112, and 114 may also store one or more applications configured to receive and/or provide information to location-based services, or to facilitate performance of location estimation or determination techniques. The memories may also store applications for performing location estimation or determination techniques.

Networks 120, 122, 124, and 130 may include virtually any radio access networks or hard-wired access networks (collectively, "access networks") for facilitating communications to or from mobile devices 110, 112, and 114 using any wireless protocol or standard. These protocols or standards include GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), VoIP, SUPL, IP Multimedia Subsystem ("IMS"), and/or the like. Additionally, networks 120, 122, 124, and 130 may include hard-wired networks for facilitating communications to or from mobile devices 110, 112, and 114 using any protocol or standard, such as cable networks, wired telephone networks (e.g., a PSTN), or other wired IP networks. Networks 120, 122, 124, and 130 may be operated by a mobile telephony service provider, a cable operator, an Internet service provider, online service providers, a wired telephone network operator or service provider, businesses, individuals, or other network operators.

In FIG. 1, networks 120, 122, and 124 are illustrated as macronetworks, e.g., networks typically designed to cover relatively large areas such as cities, metropolitan areas, regional areas, multistate areas, and/or the like. Protocols and standards such as GSM, TDMA, UMTS, EVDO, LTE, CDMA, OFDM, GPRS, EDGE, AMPS, WiMAX, UMB, and/or the like are generally employed with macronetworks. Further, network 130 is illustrated as a micronetwork, e.g., a network typically designed to cover a smaller area such as a neighborhood, park, city, building, home, and/or the like. To provide an example, protocols and standards such as WiFi, GAN, UMA, Wireless Universal Serial Bus (WUSB), Zig-Bee, and/or the like are generally employed with micronetworks. However, in certain circumstances (e.g., in conjunction with picocell broadcast architecture or the like), micronetworks may also employ protocols or standards more traditionally associated with macronetworks. For example, in some implementations, LTE or 3G protocols may be used in a micronetwork that provides typical LTE/3G functionalities but over a smaller physical range than typical LTE/3G networks. Such networks or their components may be known as a nano-e-node Bs or home e-node Bs ("HeNB").

At any given location, one or more of networks 120, 122, 124, and 130 may provide overlapping coverage areas. For example, at a particular geographical location, a mobile device 110, 112, 114 may be within range of a UMA network, a GSM network, a UMTS network, an EVDO network and may be physically connected to a hard-wired IP-based cable network. At another geographical location, the mobile device may be within range of the same set or a different set of networks.

At times, a user of a mobile device 110, 112, 114 or a party providing services to a mobile device may want to determine the location of the mobile device. To improve the performance of a location determination, it may be advantageous to utilize more than one overlapping network to determine the location of the mobile device. Described herein is a location continuity application server ("LCAS") that utilizes positioning measurements and/or estimated locations that are generated by multiple networks. The LCAS applies a reconciliation process that identifies two or more location estimation techniques that are implemented by different access networks and indicates how to utilize the two or more identified estimation techniques. In accordance with the reconciliation process, the LCAS interacts with various access networks identified by the process in order to receive location data or information from the access networks, including positioning measurements (i.e., data that can be used to estimate a device location) and/or estimated locations (i.e., estimates of a device location). The LCAS also analyzes the received location data to determine the location of a mobile device and provide the determined location to a location-based service.

To improve the performance of a location-based service, it is desirable to maintain position continuity and location continuity across a session. One intuitive example of a session is a telephone voice call made using a particular mobile device. In such an example, position continuity refers to taking continuous positioning measurements of the mobile device within a network (e.g., continuously making RTT measurements or range measurements) during the session, even as the mobile device utilizes different types of access networks at different points during the call. In the example, location continuity refers to continuously determining or estimating the geographic location of the mobile device (e.g., latitude, longitude and/or altitude) using the positioning measurements (e.g., using RTT analysis techniques) and providing determined locations to a location-based service even as the mobile device utilizes different access networks or moves away from one of the home access networks. Other examples of sessions include data, multimedia, location and/or messaging sessions.

In other scenarios, a session may span multiple access networks, mobile devices, IMSs, network cores, applications running on mobile devices or elsewhere, application sessions, charging schemes (i.e., billing schemes), or other session factors. Generally speaking, position continuity refers to the ability to continuously take positioning measurements of one or more mobile devices 110, 112, and 114 using network hardware such as one or more SMLC, SAS, E-SMLC, SPC, LIS, and/or IP SMLC (all described herein with respect to location estimation component 350) even as one or more session factors change during a session (e.g., as the access network, application, or mobile device that is used changes). Location continuity generally refers to preserving the ability to deliver an initial location estimate and subsequent updated location estimates to a public safety answering point ("PSAP") or another location-based service, following a handover from one access network to another (and/or following a change in another session factor), in a manner that is transparent to the PSAP or location-based service. The definitions of a session and session continuity are developed in greater detail in technical specifications and reports developed by the 3rd Generation Partnership Project ("3GPP"™), including TR 23.893 v8.0.0, which is incorporated herein by reference in its entirety.

FIG. 2 is a diagram illustrating an example use case where position continuity and location continuity are desirable across a session involving an emergency call (e.g., a 911 call).

In the depicted example, at time T1 a mobile device 110 utilized by a user is in range of a GSM access network 122. At time T1 the user requests and receives an estimate of his location using a navigation program installed on the mobile device. At time T2, as a result of motion by the user, the mobile device 110 is in range of both the GSM access network 122 and a UMTS access network 120. At time T2, the user utilizes the mobile device to initiate an emergency call (e.g., a 911 call to report a serious car accident). At time T3, the mobile device 110 has moved out of range of the GSM access network 122 (e.g., because the user drives out of the range of the GSM access network, or because the GSM access network otherwise becomes unavailable). Prior to time T4, the user of mobile device 110 adds a second mobile device 112 to the same emergency call (e.g., using three-way calling or transfer features). The mobile device 110 may also hang up on the emergency call. At time T4, the second mobile device 112 remains in range of the UMTS access network 120 but is also in range of a GAN access network 130.

In the example depicted in FIG. 2, it is desirable to rapidly and accurately determine the location of the mobile device 110 at the initiation of the call so that the emergency call may be suitably routed to an appropriate PSAP or similar entity. To do so, the disclosed location continuity service utilizes positioning measurements and location estimates from two or more of the multiple telecommunication networks that are accessible to the mobile device. That is, at time T1, the location continuity service may provide the positioning measurements and/or location estimates generated by the GSM access network 122 to network components to perform the emergency call routing. At time T2, the location continuity service may also take simultaneous positioning measurements and/or location estimates from the UMTS access network 120 since the UMTS access network is also accessible to the mobile device. The positioning measurements and/or location estimates from the two networks may be used alone or in combination to ensure the highest location accuracy. Similarly, the location continuity service quickly fixes and provides the determined location of the second mobile device 112 when the second mobile device is added to the emergency call. To do so, the location continuity service may utilize the positioning measurements and/or location estimates already generated for the mobile device 110 from the UMTS network at time T3 to estimate the location of the second mobile device. The location continuity service may also supplement or supplant the positioning measurements and/or location estimates from the mobile device 110 with positioning measurements and/or location estimates for the second mobile device 112 from the UMTS access network 120 or GAN access network 130. By doing so, the location continuity service provides the best location information regarding the session to the PSAP.

Illustrative Communications System

Figure 3:
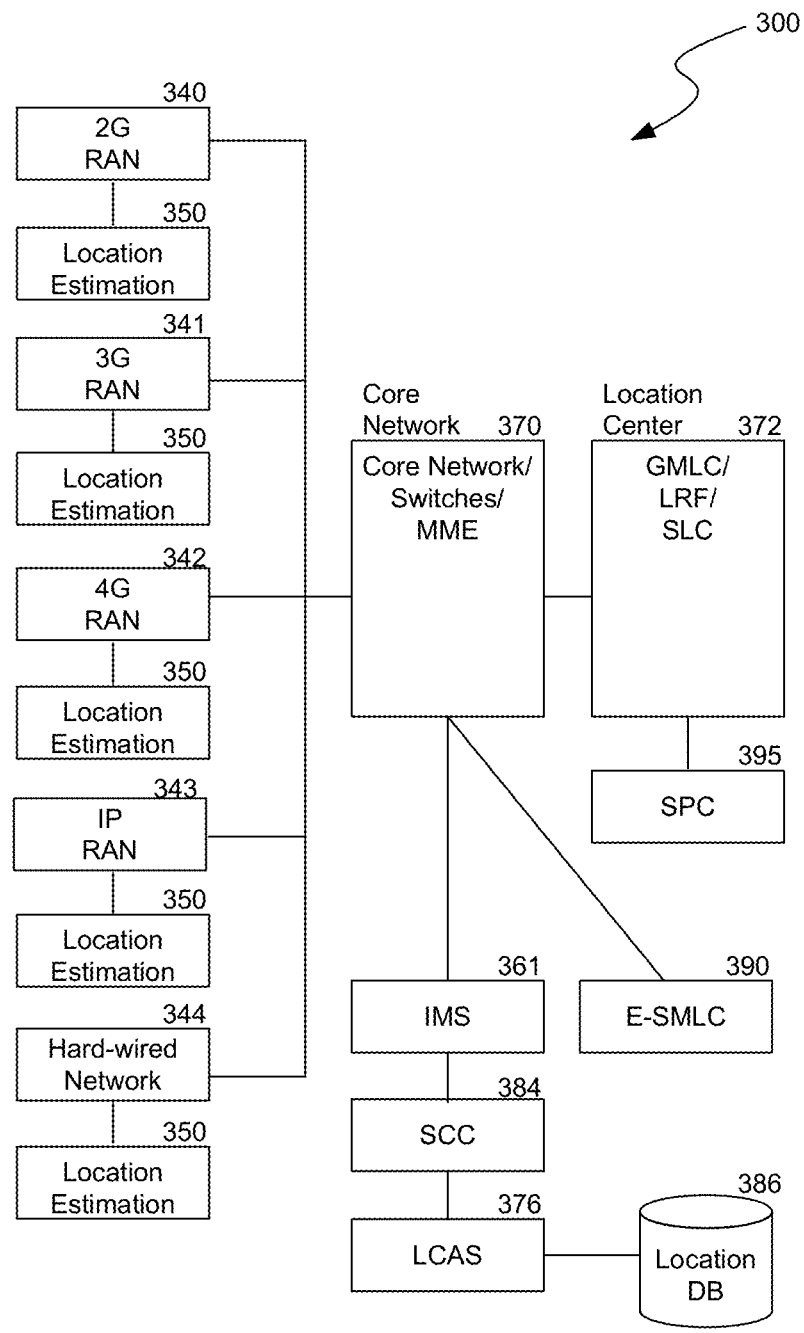
FIG. 3 is a block diagram of a suitable communications system in which the location continuity service operates.

FIG. 3 illustrates a communications system 300 in which the location continuity service may be utilized to provide position and location continuity across access networks. Communications system 300 depicts five access networks 340-344 that are coupled to supporting network infrastructure via one or more core networks 370. While five access networks are depicted in FIG. 3, it will be appreciated that a greater or lesser number of access networks may exist within the communications system 300. The communications system 300 depicted in FIG. 3 is operated by one or more telecommunications service providers, and may be coupled (not shown) with other communications systems operated by the same or other telecommunications service providers.

A second-generation radio access network ("2G RAN") 340 may include any combination of radio access networks that utilize second-generation ("2G") and 2G transitional mobile telephony protocols to communicate with mobile devices, such as radio access networks that use protocols such as GSM, IS-95, GPRS, IS-2000, and/or EDGE. The 2G RAN 340 may take positioning measurements and/or provide location estimates by utilizing techniques that are compatible with the applicable second-generation protocols. For example, the 2G RAN 340 may comprise a GSM access network configured to provide positioning measurements and/or location estimates using U-TDOA, CI-TA, E-CGI, GPS, AGPS, and/or E-OTD techniques and/or hybrid methods that employ combinations of these techniques.

A third-generation radio access network ("3G RAN") 341 may include any combination of radio access networks that utilize third-generation ("3G") and 3G transitional mobile telephony protocols to communicate with mobile devices, such as radio access networks that use protocols such as UMTS, IS-856, HSDPA, HSUPA, EVDO, and/or IEEE 802.16e-2005. For example, 3G RAN 341 may comprise a UMTS access network configured to provide positioning measurements and/or location estimates using CI, CI-RTT, GPS, AGPS, and/or OTDOA techniques and/or hybrid methods that employ combinations of these techniques.

A fourth-generation radio access network ("4G RAN") 342 may include any combination of radio access networks that utilize fourth-generation ("4G") and 4G transitional mobile telephony protocols, such as radio access networks that communicate with mobile devices using protocols such as LTE, Advanced LTE or LTE+ and WiMAX. As an example, 4G RAN 342 may comprise a WiMAX access network that provides positioning measurements and/or location estimates using A-GPS, U-TDOA, Cell ID, and/or hybrid methods that employ combinations of these techniques. As another example, 4G RAN 342 may comprise an LTE access network that provides positioning measurements and/or location estimates using AGPS, downlink positioning, CI and enhanced CI techniques, OTDOA, TDOA, AGNSS and/or hybrid methods that employ combinations of these techniques.

An IP radio access network ("IP RAN") 343, provides voice and/or data access to mobile devices and may comprise one or more access points and/or Unlicensed Network Controllers ("UNCs") that route communications between mobile devices and other network components over an IP-based network. An access point typically provides coverage for a relatively small area, such as for a femtocell within a building (e.g., home, office, shopping mall, train station, or the like) or within an aircraft, ship, train, or other vehicle. An access point may take the form of a WiFi access point, a HotSpot component, a wireless router, a wireless access point, and/or the like. As one example, IP RAN 343 may comprise a GAN that provides location estimates using identifiers such as MAC addresses, IMSI, IP addresses, and/or CGI and/or hybrid methods that employ combinations of these identifiers.

A hard-wired access network 344 provides IP-based network access to mobile devices via a wired physical communication link between the mobile device and the hard-wired access network 344. For example, a hard-wired access network 344 may comprise a cable network, a public switched telephone network (PSTN), and/or similar. As one example, a hard-wired access network 344 may provide positioning measurements and/or location estimates for a mobile device using the HTTP Enabled Location Delivery ("HELD") standards generated by the Internet Engineering Task Force ("IETF"), details of which may be found at tools.ietf.org. Other wireless IP-based networks (e.g., IP RAN 343) may similarly provide positioning measurements and/or location estimates using HELD standards. As another example, a hard-wired access network 344 may also provide positioning measurements and/or location estimates for a mobile device using a customer provided location address, an IP location, and a Layer 2 address of the end device.

Each of the various access networks 340-344 may be connected to a location estimation component 350 that provides and/or coordinates positioning measurements and/or location estimations within the corresponding access networks 340-344. Location estimation components 350 may comprise one or more discrete location estimation systems including, inter alia, a Serving Mobile Location Center ("SMLC"), a Standalone Assisted GPS SMLC ("SAS"), a Location Information Server ("LIS") (e.g., as described by the HELD standards discussed previously), and/or an IP SMLC. For simplicity, in FIG. 3, all the various discrete location estimation systems are shown within a single, amalgamated location estimation component 350, since each discrete system provides similar or analogous functionality. However, one having skill in the art will appreciate that a given access network may only be directly connected to a subset of the discrete systems represented by the amalgamated location estimation component 350. For example, a 2G RAN 340 may only be directly connected to an SMLC within the location estimation component 350 and not to an SAS. Moreover, certain location estimation systems may be connected to and provide location services across multiple networks 340-344. The communications system 300 may comprise other components that also provide and/or coordinate positioning measurements and/or location estimations within access networks, but these additional components may not be directly connected to the various access networks. For example, the communication system 300 may comprise an Evolved Serving Mobile Location Center ("E-SMLC") 390 that is connected to the core network 370 and a SUPL Positioning Center ("SPC") 395 (e.g., as described by the SUPL standards available from the Open Mobile Alliance ("OMA")) that is connected with the location center 372. In some implementations, a location estimation component 350 may be a sub-component of the E-SMLC 390.

The various access networks 340-344 are also connected to a core network component 370 that provides core network control, including switching or otherwise routing voice and/or data between location estimation components 350; access networks 340-344; a Public Switched Telephone Network ("PSTN"); a telephone switch such as a 5ESS switch, a PBX switch; a data or IP network; a router; other switches; other core network components; and/or the like. The core network component 370 may include one or more discrete network components, including, inter alia, switches, a Mobility Management Entity ("MME") (e.g., as described by the System Architecture Evolution ("SAE") standards available from the 3GPP, such as by TS 33.40) and/or similar components that provide core network control. Also, the core network component 370 may include a Mobile Switching Center ("MSC"), a media gateway, a call gateway, and/or the like. For simplicity, in FIG. 3, all the various discrete network control components are shown within a single, amalgamated core network component 370 since each discrete component provides similar or analogous functionality. One having skill in the art will also appreciate that each discrete network component may be configured to directly couple or interact with only a subset of the access networks 340-344 and/or a subset of the discrete location estimation systems represented by each location estimation component 350.

The core network component 370 is connected to a location center 372. The location center 372 is configured to send location estimation requests to, and receive location data from, access networks 340-344, the location estimation component 350, E-SMLC 390 and/or SPC 395. To do so, the location center 372 is configured to request or determine routing information (e.g., from a Home Subscriber Server). The location center 372 may additionally perform administrative functions such as authentication/security, privacy and billing. The location center 372 may additionally be coupled to an Automatic Location Identification Database ("ALI database") server and/or similar database servers that map phone numbers (or IP addresses or similar identifiers) to physical addresses or geographical locations. The location center 372 may include one or more discrete location center components, including, inter alia, a Gateway Mobile Location Center ("GMLC"), a Location Retrieval Function ("LRF") (e.g., as described by the IMS specifications and technical reports of the 3GPP, Telecoms and Internet Converged Services and Protocols for Advanced Networks ("TISPAN"), or other standards organizations), a SUPL Location Center ("SLC") (e.g., as described by the SUPL standards available from OMA), and/or similar. For simplicity, in FIG. 3, all the various discrete location center components are shown within a single, amalgamated location center 372 since each discrete component provides similar or analogous functionality. Furthermore, for simplicity, only a single connection is shown between the core network component 370 and the location center 372. However, one having skill in the art will appreciate that each discrete location center component may be configured to directly couple or interact with only a subset of the access networks 340-344, a subset of the discrete location estimation components within the amalgamated location estimation component 350, and/or discrete core network components within the core network component 370.

The core network component 370 is also connected to an IP Multimedia System (IMS) 361, which interacts with other network components to provide IP services to a mobile device. An IMS 361 may include a Proxy Call Session Control Function ("P-CSCF"), an Emergency Call Session Control Function ("E-CSCF"), and Home Subscriber Server ("HSS"), e.g., as described by the IMS specifications and technical reports of the 3GPP, TISPAN or other standards organizations, including technical reports TR 23.826, TR 23.870, and/or TR 23.167, all developed by the 3GPP.

The IMS 361 is connected to a Session Continuity and Consistency Server ("SCC") 384. Generally an SCC provides IMS-based mechanisms for enabling service continuity of multimedia sessions. The SCC may implement functionalities such as handling access network transfers, mobile device transfers, and multiple media flows. SCC 384 may be an SCC as described by the IMS specifications and technical reports of the 3GPP, TISPAN, or other standards organizations, including 3GPP Technical Specification 23.237 V9.1.0. Although current implementations of an SCC enable various aspects of session management within a single network, these implementations do not provide seamless location determinations across multiple access networks and/or mobile devices as shown in FIG. 2.

Each of the discrete components within the location center 372 (e.g., a GMLC, LRF and/or SLC) is suitable for determining and serving the location of a mobile device as determined by a single access network. However, each of these discrete components takes a piecemeal approach to location determinations and thus typically these discrete components cannot consistently provide position continuity and/or location continuity across different access networks and different mobile devices as shown in FIG. 2. In order to provide improved position continuity and/or location continuity as a user changes networks and/or devices, a Location Continuity Application Server (LCAS) 376 is therefore introduced into the system. The LCAS 376 is coupled to location center 372 via the SCC 384 and IMS 361 so it may initiate multiple location estimations or determinations in multiple access networks and reconcile the results of these multiple determinations.

As will be described in additional detail herein, LCAS 376 receives location data, including positioning measurements or location estimates, from one or more components and subsystems within communications system 300 or from other communications systems. The LCAS 376 stores the received data in a location database ("DB") 386, and uses the received data in order to accurately determine a location of a mobile device using various location determination methods. The determined location is provided to emergency, commercial, and/or other location-based services. In one example, LCAS 376 is configured to provide determined location information to a PSAP, e.g., as part of an E911 service. LCAS 376 may also be configured to provide determined location information to any other entity or for any other purpose. For example, LCAS may be configured to provide determined location information to mobile device users, network operators or network components, third-party location-based service providers, remote telemetry users, advertisers, and/or the like.

Although shown as a discrete component, some or all of the functionality of the LCAS 376 may be performed by the SCC 384. Additionally or alternatively, some or all of the functionality of the LCAS may be performed in whole or in part by a mobile device 110, 112, 114 (e.g., by a location continuity stack application resident therein) and/or one or more other system components, including the location estimation component 350. To simplify system architecture, the LCAS may provide some of the functionality that is typically provided by a service broker within the IMS 361 and/or may interact with a service broker within the IMS. The LCAS 376 is described in greater detail with respect to FIG. 4.

While communications system 300 is illustrated and described in terms of 2G, 3G, 4G, IP RAN, and hard-wired network components and architecture, the system is not limited to such technologies. Any suitable communications system may employ aspects of the invention described herein. Additionally, while FIGS. 1-3 illustrate specific examples of suitable environments and communications systems in which aspects of the invention may be practiced, various modifications, such as the inclusion of additional components, consolidation and/or deletion of various components, and shifting of functionality from one component to another may be made without deviating from the invention.

Location Continuity Application Server ("LCAS")

Figure 4:
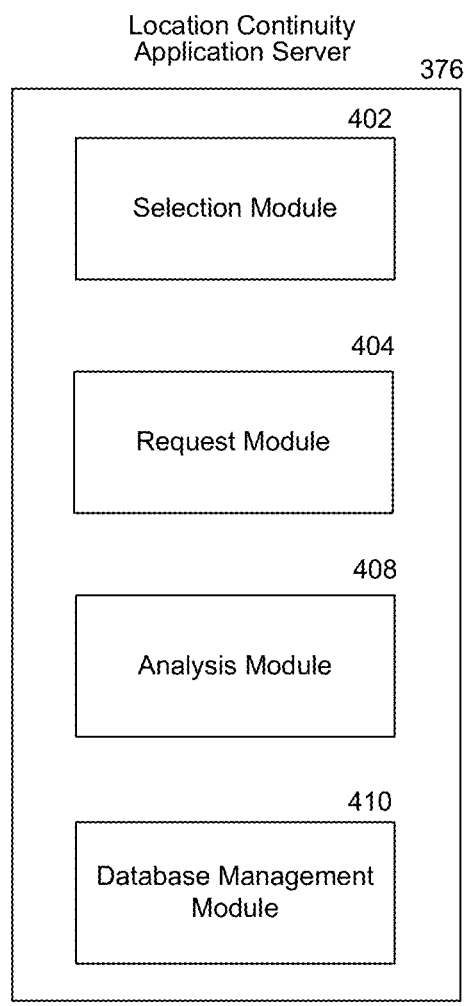
FIG. 4 is a block diagram of a location continuity application server.

FIG. 4 is a block diagram of the LCAS 376. As shown, LCAS 376 comprises a selection module 402, a request module 404, an analysis module 408, and a database management module 410.

The LCAS 376 facilitates continuous positioning measurements and location determinations in response to a request to locate a mobile device 110, 112, 114. The request that the LCAS locate a mobile device may be received at any time, regardless of whether the mobile device is powered on, powered off, in use, or sitting idle. For example, a request may be received prior to, during, and/or after a call is made on the mobile device. A request from a service for the location of a mobile device may be received only once (e.g., to provide a map for the mobile device), or may be received frequently (e.g., during an emergency event where it may be important to accurately track the movement of the mobile device at all times).

The selection module 402 receives the request for the location of the mobile device from a requesting service and selects a suitable location determination method or methods for the system to utilize in order to locate a particular mobile device in a manner that is responsive to the requesting service. The selection module 402 may analyze any relevant criteria to select a suitable location determination method or methods. Criteria used in the selection process include:

The type, make, model, or capabilities of the mobile device 110, 112, 114 being located.

The types of access networks currently or previously available to the mobile device being located and related criteria, such as a network's signal strength at the mobile device.

The quantity, quality and nature of stored historical location data for the mobile device, including historical positioning measurements, estimated locations, and reference locations.

The quality of service ("QoS") required by the requesting location-based service. For example, the QoS metrics required for an emergency service may be more stringent than for a navigation application or a location-based search application. The QoS may include both location accuracy and timeliness of location response.

The costs or resources associated with using the various determination methods.

Any other current or past session factors, such as the IMS used (e.g., a home IMS or visited IMS), core IP network used (e.g., a home core IP network versus a visited core IP network), application used, application session, and applicable charging scheme.

More details regarding the selection of one or more suitable location determination methods may be found in assignee's U.S. patent application Ser. No. 12/467,201, filed May 15, 2009, entitled "Facility for Selecting a Mobile Device Location Determination Technique", which is incorporated herein in its entirety.

When selecting a suitable location determination method, selection module 402 is not limited to selecting only a single location determination technique implemented by a single access network. Instead, selection module 402 may identify two or more determination techniques that are implemented by different access networks and specify a process to analyze the results of those two or more techniques. To indicate the appropriate method of utilizing various location determination techniques, the selection module specifies a reconciliation process that is suitable for the location request. The reconciliation process is implemented by the request module 404 and analysis module 408. A reconciliation process is generally a data structure or other information source that contains a set of rules, methods, preferences, priorities, and parameters for utilizing two or more kinds of location determination techniques that are implemented by two or more access networks. The reconciliation process may be generated from scratch based on certain criteria such as the specific conditions detected by the selection module, or may be selected from a set of stored reconciliation processes that are maintained by the selection module 402.

A reconciliation process may dictate that two or more parallel location estimation processes be initiated to guard against failures or inaccuracy of any one location estimation process. The selection module 402 might require this type of reconciliation process if the location-based service requesting location data requires a high quality of service regardless of cost. The selection module 402 might also require this type of reconciliation process for an emergency (e.g., E911) service. As an example, the LCAS initiates a primary method of location determination (e.g., AGPS or U-TDOA), and one or more backup methods of location determination (e.g., CI-RTT, hybrid RTT, and/or LTE-based methods). If the primary method of location determination fails to produce location estimates with a desired accuracy or uncertainty (or satisfy other performance metrics, such as a desired time to fix ("TTF")), the LCAS may instead utilize results from one or more backup methods.

To describe a parallel location estimation, a reconciliation process indicates which location determination methods should be initiated in which access networks and when and how these methods should be initiated. For example, a reconciliation process may configure the signaling period for a particular access network and/or mobile device 110, 112, 114. The reconciliation process provides rules and parameters for selecting between the results of a primary and backup location estimation method. For example, a reconciliation process may indicate the accuracy, TTF, and/or other performance metrics that must be achieved by a primary or backup method. As another example, a reconciliation process may provide a rank ordering of backup methods.

A reconciliation process may also provide various rules, methods, and parameters for utilizing positioning measurements, location estimates, and/or other location data that is provided by a visited communications systems 300. Such a reconciliation process may permit the system to provide greater positioning and location continuity when a mobile device roams outside its home communications system 300.

A reconciliation process may also indicate how to utilize positioning measurements, estimated locations and/or other location data that were generated for different mobile devices. For example, a reconciliation process may indicate how positioning measurements and/or estimated location data generated for one or more mobile devices 110, 112, 114 may be used to determine the location of another mobile device. For example, a reconciliation process may specify that if one mobile device 110 owned by a particular user cannot be located with sufficient accuracy (or with a certain TTF), that the system should utilize the determined location of another mobile device 112 owned by or otherwise associated with the same user.

As another example, a reconciliation process may indicate how positioning measurements and/or estimated locations generated for one session may be used to determine the location of a mobile device during another session. For example, a reconciliation process may specify that a location estimate generated previously by a GSM network for a navigation program on a mobile device may be provided to a location-based search running on the same mobile device. This prior location estimate may be provided to the location-based search application until an overlapping UMTS network generates a new location estimate having sufficient accuracy.

These examples of reconciliation processes are intended to be illustrative, not exhaustive. The selection module 402 may indicate a reconciliation process that blends elements of these examples or utilizes other suitable location determination approaches. Various examples of reconciliation processes are described in greater detail herein.

The request module 404 initiates location estimations in various access networks and/or retrieves location data such as estimated locations and positioning measurements from various access networks in accordance with a reconciliation process. To do so, the request module 404 may request that the location center 372, a mobile device 110, 112, 114, and/or another system component initiate positioning measurements and/or location determinations in one or more access networks and/or provide location data for a mobile device. In some implementations, the request module 404 may utilize the IMS 361 to relay such a request.

The analysis module 408 analyzes various location data that are received or accessed from various access networks as a result of the requests made by the request module 404, including positioning measurement data and/or estimated location data. The analysis module 408 applies the specified reconciliation process to the various data sets to generate a set of determined locations that LCAS 376 may utilize. Database management module 410 is responsible for maintaining, updating, and providing access to positioning measurements, estimated locations, and other location data stored in location database 386. For example, the database management module maintains positioning measurement data and/or estimated location data generated by various access networks that were requested by request module 404 or received by analysis module 408. Database management module also maintains determined location data generated by analysis module 408 based on the applied reconciliation process. In response to a request for location data, the database management module 410 provides the requested positioning measurement data and/or estimated location data.

The LCAS 376 provides the determined location of the mobile device to the requesting service. The requesting service may be a PSAP or another emergency location-based service, another system component (e.g., an E-CSCF, P-CSCF or a system component that performs network registration or billing functions) within the same or a different communications system an LCAS associated with a different communications system, or any other requesting service (e.g., a navigation application, an asset tracking or recovery service, another non-emergency location-based service, etc.). The requesting service may be operated by commercial entities and/or non-commercial entities (e.g., governmental, non-profit, or other non-commercial entities). The location information may be provided for free, or a charge may be levied against the requesting service and/or a user of a mobile device 110, 112, 114 when the location data is provided.

Alternatively or additionally, the memories of mobile devices 110, 112, 114 may store a location continuity stack application in order to improve location continuity and/or position continuity over a call session and/or other type of session. In some implementations, a location continuity stack application may perform some or all of the functionality of LCAS 376, including the functionality provided by its selection module 402, request module 404, and/or analysis module 408. For example, a location continuity stack application may be configured to permit a mobile device to simultaneously register with two or more access networks, and/or to continuously conduct positioning measurements and/or location estimations with two or more access networks. As another example, a location continuity stack application may be configured to permit a mobile device to seamlessly initiate positioning measurements and/or location estimations with a newly accessed network. As yet another example, a location continuity stack application may be configured to permit a mobile device to analyze multiple sets of location data (e.g., estimated locations) provided by various access networks.

Those skilled in the art will appreciate that the LCAS 376 may be implemented on any computing system or device. Suitable computing systems or devices include personal computers, server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic- or optical-based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Location Data Storage

FIG. 5 shows a table 500 that conceptually illustrates the type of location data or information generated and stored by LCAS 376 and its components in location database 386. As used herein, the terms "location data" or "location information" include positioning measurements (e.g., range measurements of a mobile device within a network) and estimated locations (e.g., an estimate of the latitude, longitude and/or altitude of a mobile device and, in some implementations, the time and/or estimated or calculated uncertainty or accuracy of the location estimate). As described herein, the location data in location database 386 may be utilized in location determination techniques or to otherwise improve position and/or location continuity. As an example, stored location data for one mobile device may be utilized to locate a second mobile device. As another example, to improve location continuity, location data in location database 386 may be sent to a visited communications system when a mobile device roams into the visited network.

The location data in location database 386 may also be utilized for various commercial and non-commercial purposes, such as marketing intelligence, network registration, billing/charging, location-based advertising campaigns, remote telemetry, social networking technologies, or any other location-based service that may benefit from mining historical location data. Additional examples include asset tracking or recovery services, customer analytics, and mobile device security.

As shown in FIG. 5, the table 500 includes columns for a session identifier ("ID") 505 and a mobile device ID 510. A session ID is a globally or locally unique identifier for a particular session and a device ID is a globally or locally unique hardware identifier for a mobile device 110, 112, 114. Each row 545, 550, 555, 560 in table 500 corresponds to a unique combination of a session and device. For example, the first and second rows 545, 550 each correspond to session ID "A3F1," but the two rows have different device IDs ("LL13" and "DJ82," respectively).

Table 500 may have additional columns (not shown) that reflect other session or state factors related to a row. For example, table 500 may have additional columns that reflect the application(s), access network(s), and/or core IP network(s) used during a session. Each entry in these additional columns may reflect either a single static value, or may reflect a time series (for example, to reflect how a mobile device moved from one access network to another over time). In some implementations, each row may correspond to a different combination of session factors (and/or other factors). For example, table 500 may have a separate row for each unique combination of a session, device, and application (e.g., a navigation application versus a location-based search application).

Columns 525-540 in table 500 reflect estimated locations for each session/device pair generated by a particular type of access network using a particular type of location determination technique. For example, column 525 may include estimated locations generated by a first access network (e.g., a GSM network) using a first location determination method (e.g., U-TDOA) while column 530 may include estimated locations generated by the first access network (e.g., the same GSM network) using a second location determination method (e.g., AGPS). As another example, column 535 may include estimated locations generated by a second access network (e.g., a UMTS network) using the second location determination method (e.g., AGPS). As shown, there may be any number of additional columns 565, each of which corresponds to a unique combination of an access network and a location determination method.

As indicated in FIG. 5 with the text "[t]," each individual entry in columns 515-540 may reflect a time series of estimated locations. Each entry in these columns may have one, none, or multiple location estimates, where each location estimate is associated with a particular point in time. Furthermore, each location estimate may be expressed as a range or confidence window indicating a two- or three-dimensional geographical area (e.g., +/−5 meters) or may be associated with an estimated or calculated accuracy or uncertainty. As shown, not every combination of access network and device will contain estimated locations. A particular device may not utilize a particular access network or a particular location determination technique may not have been used to estimate the location of a device. For example, as shown by the text "NULL" at row 555, column 540, the device "A6N5" has not utilized Network 3. As another example, as shown at row 550, column 530, the device "DJ82" utilized Network 1, but as shown by the text "NULL" at row 550, column 525, Network 1 did not estimate its location using Method 1.

Additionally or alternatively, although not shown, table 500 may include columns that represent raw positioning measurement data (e.g., range measurements of a mobile device within a network, a cell identity, a base station latitude or longitude, etc.) or additional information related to the derivation of estimated locations generated by various access networks. For example, table 500 may include a column for reference locations that were generated by various access networks. As an example, the "L3[t]" entry at row 545, column 535 may represent the estimated location of a mobile device "LL13" at various time points as determined by Access Network 2 using an AGPS technique. In this example, table 500 may include an additional column (not shown) that stores the AGPS reference location(s) used to calculate L3[t]. As another example, an entry in table 500 may be associated with one or more identifiers of a cell, femtocell, picocell, access point, base station, Node-B, eNode-B, cell site, and/or other network component or network that were accessible to the mobile device, and that were utilized to estimate the location of the mobile device associated with that row. For example, table 500 may associate an entry with a time series of identifiers that reflects how a mobile device moved from one base station (BTS 340) to another within a particular access network.

Table 500 also includes columns for estimated locations that are generated using a reconciliation process that is applied by the LCAS. For example, column 515 contains a location that was determined by a reconciliation process H1, and column 520 contains a location that was determined by a reconciliation process H2. The table may have any number of additional columns each reflecting locations that are generated by a different reconciliation process. Entries in these columns may have been generated using the other various entries in the table (i.e., the estimated location, positioning measurement data, or related information that is generated by various access networks). As indicated by the text "F1[L1[t]-Ln[t]]," for example, a determination method that is used to generate data in column 515 may functionally combine or otherwise utilize location data that is generated for other mobile devices, other session factors, or other sessions altogether.

Initiating and Utilizing Multiple Parallel Location Estimations

Figure 6:
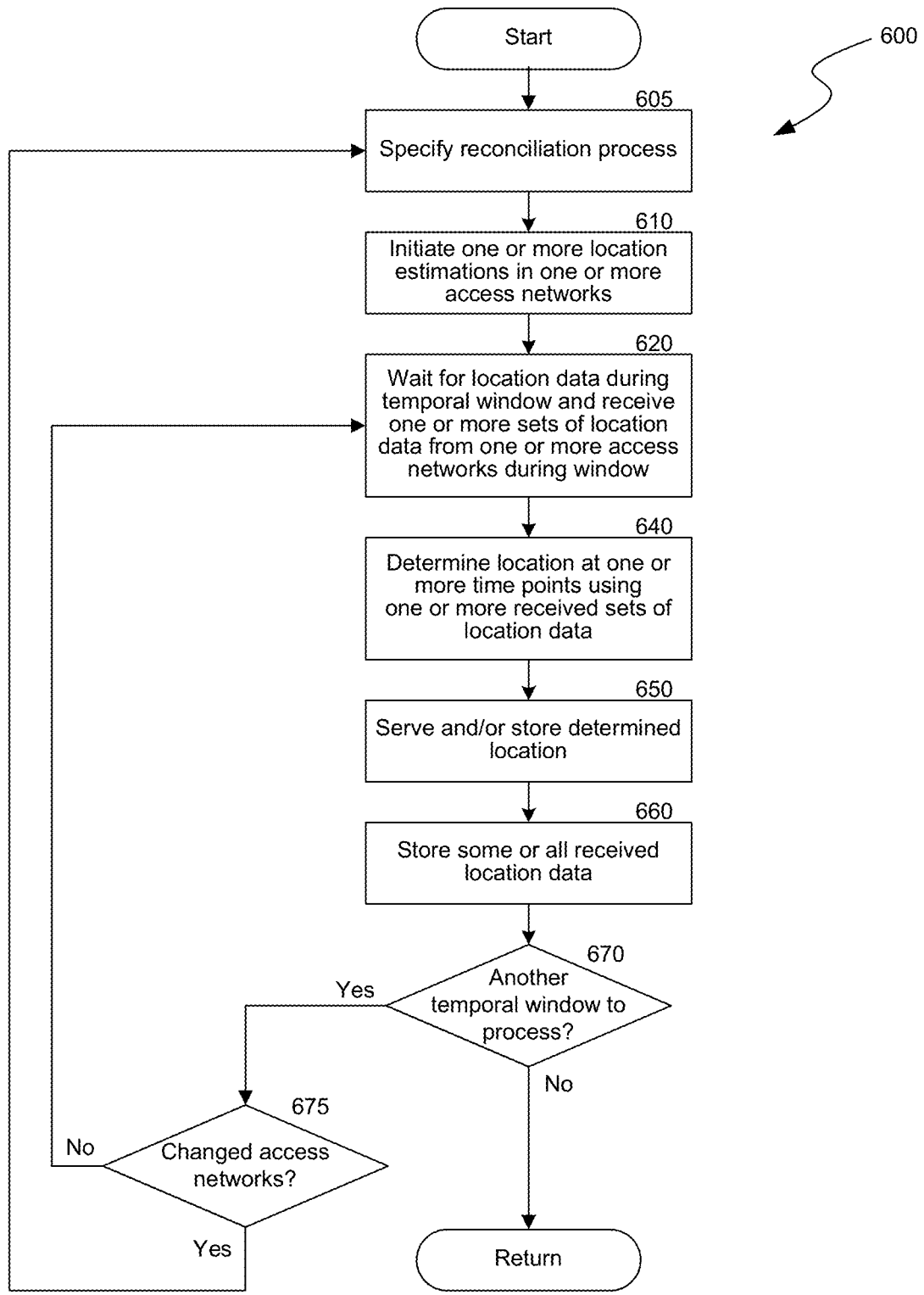
FIG. 6 is a logical flow diagram of a process for initiating and utilizing multiple location estimations in one or more access networks.

FIG. 6 is a logical flow diagram of a process 600 for initiating and utilizing multiple parallel location estimations by one or more access networks. LCAS 376, its components, or another suitable system may perform process 600 in order to provide determined locations in response to a request from an emergency or non-emergency location-based service to locate a mobile device. By using parallel location estimations from various access networks in process 600, the location continuity service may improve accuracy, yield, and/or TTF when locating a mobile device. As an example, process 600 may initiate three parallel location estimations in two access networks, such as one primary determination and two backup estimations, to prevent delays and/or inaccuracies that might otherwise result if a positioning measurement and/or location estimation using the primary method fails.

Process 600 begins at block 605, when LCAS 376 utilizes selection module 402 to generate or select a reconciliation process that is applicable to the mobile device 110 based on the available access networks and/or other applicable criteria, as described previously. The selection module specifies a reconciliation process that gracefully handles failed positioning measurements and/or failed location estimations. The reconciliation process that is generated indicates which location estimation or determination method to initiate in which access networks, and when and how to initiate these methods. The generated reconciliation process also provides rules and parameters for selecting between the resulting estimated locations determined by the selected location estimation methods.

For example, selection module 402 may specify a reconciliation process for a mobile device that requires an available GSM network to perform a U-TDOA location estimation for the mobile device 110, and an overlapping UMTS network to also simultaneously perform AGPS and OTDOA location estimations for the mobile device. The specified reconciliation process may dictate that AGPS location estimates should be utilized to locate the device except for time points where AGPS produces estimates having accuracy worse than 100 meters. In this example, the reconciliation process may further dictate that in the event that the AGPS method fails to produce results of the desired accuracy or uncertainty, the more accurate (or less uncertain) of the two backup methods (OTDOA and U-TDOA) should be utilized to determine the location of the device.

At block 610, LCAS 376 initiates one or more location estimations or determinations in one or more access networks in accordance with the reconciliation process. For example, in accordance with the previous example of a reconciliation process, the LCAS may request a GSM network to perform a U-TDOA location estimation for a mobile device 110, and an overlapping UMTS network to also simultaneously perform AGPS and OTDOA location estimations for the same mobile device.

At block 620, LCAS 376 waits for location data (e.g., location estimates) during a temporal window. The length of the temporal window may vary depending on the types of location estimations that were requested and/or other factors such as the accuracy or TTF required by the location-based service that will utilize the results of process 600. For example, in some implementations, the length of the temporal window may be chosen so that even the location determination method having the longest TTF and/or other latencies may return an estimated location. In other implementations, the temporal window may be chosen so that the functions described in blocks 620-660 may be performed within the TTF required by the location-based service that will utilize the results of process 600. The applicable reconciliation process may include a parameter that dictates the length of the temporal window used.

At block 620, LCAS 376 also receives one or more sets of location data (e.g., location estimates) from one or more access networks during the temporal window. For example, LCAS may receive from a GSM access network one set of location estimates generated by a U-TDOA method, and from a UMTS access network two sets of location estimates that are generated by AGPS and OTDOA techniques. Each data set may include one or more estimates of the location of a mobile device 110 at a certain time point. The various location data sets may include location estimates for different time points. In addition to estimated locations, LCAS may receive other location data or other information from the one or more access networks. LCAS may receive an indication that one or more location determination methods failed to either take a positioning measurement and/or fix the location of the mobile device with sufficient accuracy. For example, LCAS may receive an indication from a UMTS network that an AGPS estimation method failed entirely due to lack of satellite visibility. LCAS may also receive an indication of the estimated accuracy or uncertainty of a location estimate. For example, an LCAS may receive an indication that a location estimated using a U-TDOA method is within 65 meters of the actual location of the mobile device being located. LCAS may also receive positioning measurement data (e.g., range measurements) and/or state or session information.

Instead of an LCAS 376 initiating a location determination by an access network, an access network may automatically push positioning measurements and/or estimated locations to the LCAS without intervention by the LCAS. For example, an access network may automatically provide an estimated location on a periodic basis. Alternatively, at blocks 620 and 630, rather than waiting for and receiving location data, an LCAS may actively pull positioning measurements or estimated locations from one or more access networks.

At block 640, LCAS 376 determines the location of a mobile device 110 at one or more time points during the temporal window using the one or more received sets of location data, stored location data, including received or stored location estimates and positioning measurements. To make this determination, the LCAS applies the rules, methods, preferences, priorities, and parameters for utilizing one or more kinds of location estimation techniques that are specified in the applicable reconciliation process. For example, in accordance with the example reconciliation process described above, LCAS may utilize an estimated location that is generated by a preferred or primary location determination method (e.g., AGPS), so long as the preferred method did not fail and/or the estimated location produced by the preferred method has an accuracy that exceeds a threshold value (e.g., is accurate to within 100 meters or less). As another example, in accordance with a different type of reconciliation process, LCAS 376 may determine the location of the mobile device 110 to be the location estimate that most accurately reflects the mobile device's actual location. To determine the most accurate location estimate, the LCAS may either utilize accuracy or uncertainty information received from the various access networks or access a table or data store that correlates various location determination methods to average accuracy or uncertainty.

At block 650, LCAS 376 stores and/or serves the determined location at one or more time points to the requesting service, such as a commercial service and/or emergency service. LCAS may also invoke database management module 410 to store the determined location. For example, database management module 410 may store one or more determined locations in column 515.

At block 660, LCAS 376 stores some or all of the location data received from the various access networks in location database 386 and may also store the additional information received from the one or more access networks therein. To illustrate, LCAS may add received U-TDOA data to column 540, OTDOA data to column 525, and AGPS data to column 530.

At decision block 670, LCAS 376 determines if there is an additional temporal window to process. For example, LCAS may determine if an emergency call with a mobile device 110 is still active, and thus the location of the mobile device is still needed. As another example, the LCAS may determine if a non-emergency location-based service (e.g., a navigation program) needs additional location data for a new temporal window. If there is another temporal window in which the location of the mobile device should be determined, LCAS proceeds to block 675. Otherwise the process 600 returns.

At decision block 675, the LCAS 376 determines if the set of access networks available to the mobile device 110 has changed. For example, the LCAS may determine that the mobile device has moved out of range of a UMTS access network. Although not shown, the LCAS may also determine if other relevant session factors or process criteria have changed (e.g., the application used to make a call). If the access networks or other key session factors have changed, the process 600 repeats starting at block 605, where the LCAS specifies a new reconciliation process. Otherwise, the process repeats starting at block 620.

Roaming Use Cases

During a period of its operation, a mobile device 110 may move from a home access network within a home communications system (such as communications system 300) to a visited access network in a visited communications system, or vice versa. To seamlessly maintain location-based services involving a mobile device during its handoff from a first communications system to a second communications system, an LCAS from the first communications system (a "first LCAS," such as LCAS 376) and an LCAS from the second communications system (a "second LCAS") may coordinate in order to maintain position continuity and location continuity across the handoff.

To improve the performance of its location determinations and/or to improve position continuity and/or location continuity following a communications system handoff, a second LCAS may request from a first LCAS historical location data (e.g., location estimates and/or positioning measurement data) generated by the first LCAS and/or access networks within the first communications system. The second LCAS may provide historical location data generated by the first LCAS to a location-based service until the second LCAS is able to perform its own determination of the location of a mobile device. Alternatively or additionally, a second LCAS may extrapolate historical location data generated by a first LCAS to generate an estimated location. The second LCAS provides this estimated location to a location-based service until the second LCAS is able to perform its own determination of the location of a mobile device 110 using the positioning measurements and location estimates of one or more access networks located in the second communications system. In this way, a location-based service may receive some indication of the location of the mobile device from the second communications system immediately after a handoff.

Figure 7A:
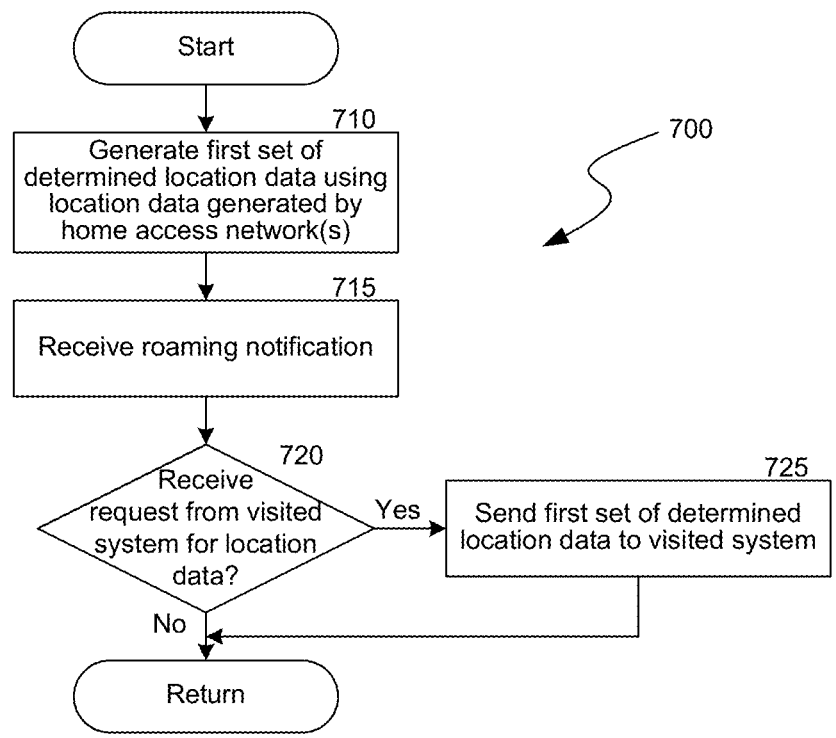
FIG. 7A is a logical flow diagram of a process for providing improved location continuity when a mobile device roams from a home access network to a visited access network.
Figure 7B:
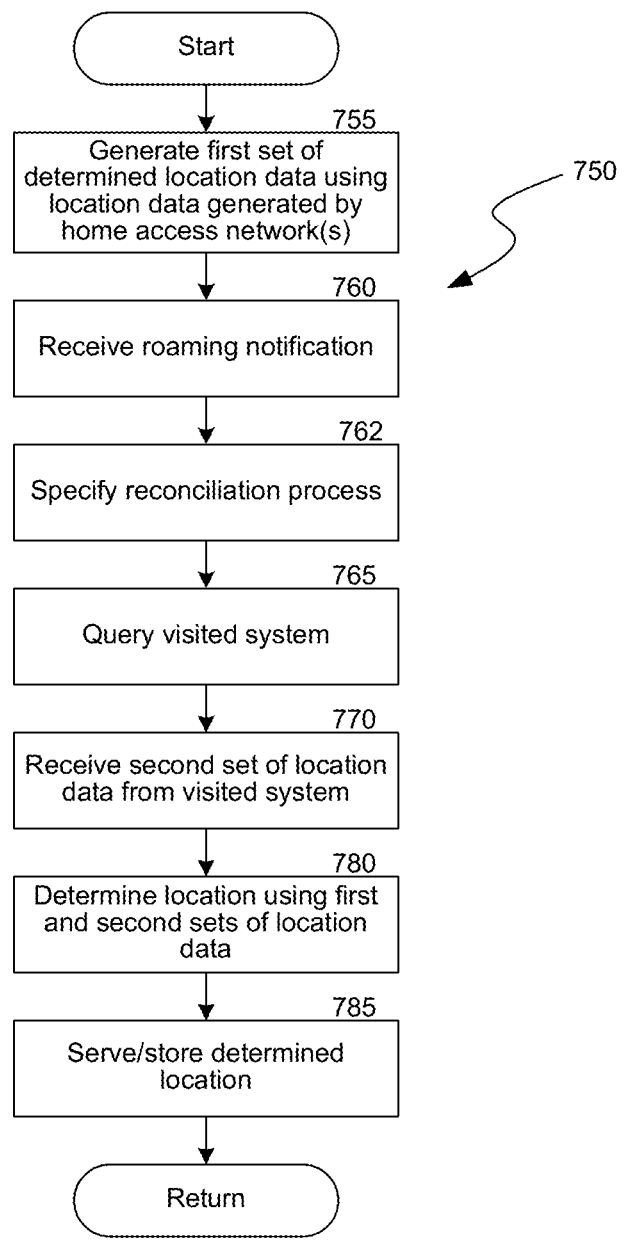
FIG. 7B is a logical flow diagram of a process for determining the location of a mobile device when the device roams from a home access network to a visited access network.
Figure 8:
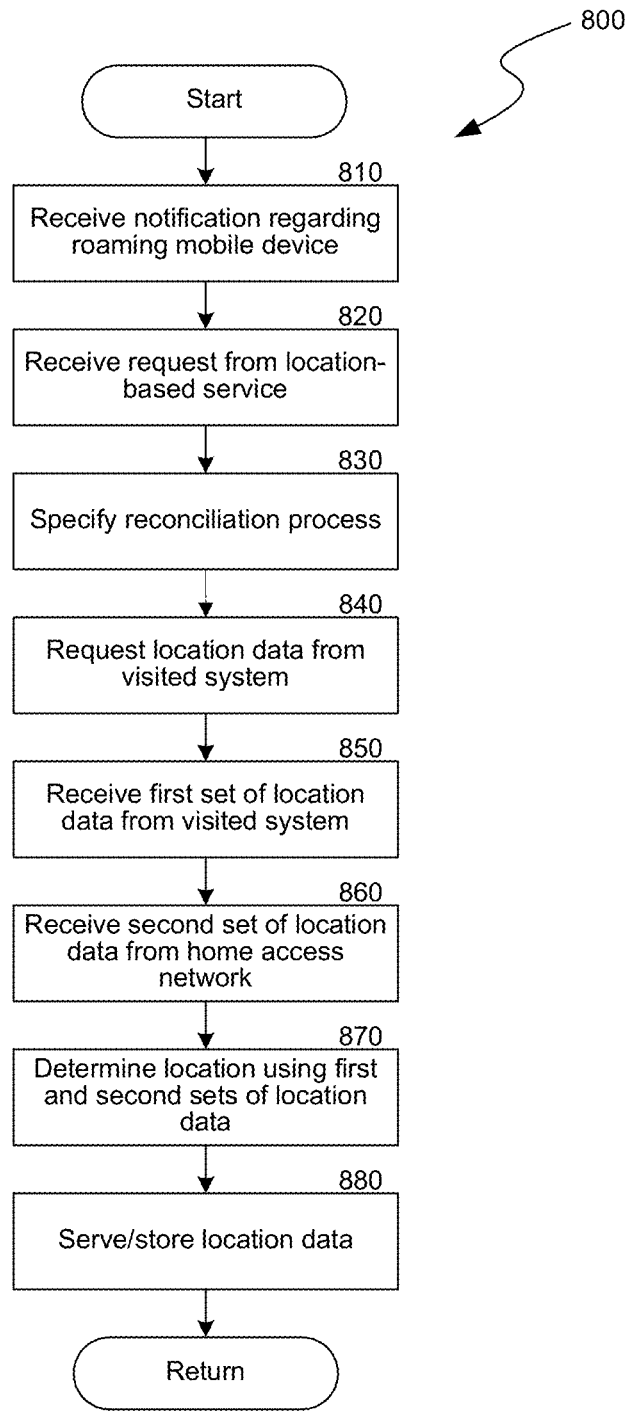
FIG. 8 is a logical flow diagram of a process for determining the location of a mobile device when a device roaming in a visited access network returns to a home access network.

FIGS. 7A, 7B, and 8 illustrate three processes for improving position continuity and location continuity across a handoff from one communications system to another.

FIG. 7A is a logical flow diagram of a process for providing improved location continuity when a mobile device roams from a home access network to a visited access network. Although not shown, when process 700 begins, a mobile device is registered with one or more home access networks within a home communications system.

When the mobile device is utilizing a home access network, a location-based service requests an LCAS within a home communications system (a "home LCAS," such as LCAS 376) to generate and provide determined location data for the mobile device to the location-based service. For example, the user may initiate a navigation application on his mobile device that may request determined location data from the home LCAS.

In response to this request, the home LCAS may initiate a process like the one shown in FIG. 6, or another suitable process, to determine the location of the mobile device within the home access network. For example, the home LCAS may initiate one or more location estimations in one or more home access networks, receive one or more sets of location data from one or more home access networks, and analyze the data sets to generate a set of determined locations that it provides to the location-based service. Thus, as shown at block 710, a home LCAS generates a first set of determined location data from one or more sets of location data that were generated by home access networks. Additionally, at block 710, the home LCAS may receive and/or analyze other information generated by one or more home access networks.

Between blocks 710 and 715, the mobile device registers with and begins utilizing a visited access network instead of a home access network. That is, the mobile device registers with an access network that is part of a visited communications system. As shown at block 715, the home LCAS receives a notification that the mobile device has moved or roamed to a visited access network. For example, the notification may come from a component of the visited communications system, such as an LCAS in the visited communications system (the "visited LCAS"). The home LCAS may notify the location-based service of the change in communications system so that the location-based service may request determined location data from the visited LCAS. Alternatively or additionally, the home LCAS may notify the visited LCAS of the ongoing request by the location-based service to receive location information about the mobile device. In this way, the home LCAS redirects or otherwise connects the location-based service to a visited LCAS within the visited communications system. Alternatively or additionally, the location-based service may detect the change in the network and automatically request determined location data from a visited LCAS on an ongoing basis.

As described previously, to improve position and location continuity, the visited LCAS may utilize historical location data generated by the home LCAS and/or home access networks. Thus, as shown at decision block 720, the home LCAS determines if it has received a request from the visited LCAS for historical location data generated by the home LCAS and/or home access networks. If the home LCAS does receive such a request, as shown at block 725, it may send to a visited LCAS the first set of determined location data that was generated at block 710. The home LCAS may also send some or all of the location data it received from home access networks prior to block 710. The process 700 then returns. Otherwise, if no request is received, the process 700 returns.

FIG. 7B is a logical flow diagram of a process 750 for determining the location of a mobile device after the device roams from a home access network to a visited access network. Such a determination may be useful for one or more purposes. For example, if redirecting a requesting location-based service from a home LCAS to a visited LCAS will take a substantial amount of time, the home LCAS may continue to provide location estimates to the location-based service in the interim period immediately following the handoff. As another example, the home LCAS may store determined location data generated by a visited LCAS in the location database 386 so that the home LCAS can provide a richer set of historical location data to other location-based services that mine historical location data such as billing services, asset tracking, customer analytics, and mobile device security services.

The process 750 begins at block 755, when the home LCAS generates a first set of determined location data using location data (e.g., location estimates) generated by home access networks. At block 760, the home LCAS receives a notification that the mobile device has moved or roamed to a visited access network (i.e., the mobile device has started roaming in a visited access network). At block 760, the home LCAS may also receive a notification indicating the type of visited access network and/or the location determination capabilities of the visited access network. For example, the home LCAS may receive an indication from a visited LCAS that the mobile device has roamed into a UMTS network capable of performing only AGPS and OTDOA location estimations. It will be appreciated that blocks 750 and 760 are the same as blocks 710 and 715 in FIG. 7A, and may reflect the same LCAS process. As shown at block 762, the home LCAS utilizes the received indication of access network and/or location determination capabilities to specify or update the reconciliation process that is applicable to the roaming mobile device. When updating the reconciliation process, the LCAS may use the information about the visited access network as selection criteria.

At block 765, the home LCAS queries the visited LCAS for the determined or estimated location of the roaming mobile device, and/or other location data, such as positioning measurement data that was generated by the visited LCAS and/or visited access networks. At block 770, the home LCAS receives a second set of location data and/or other information requested from the visited communications system. For example, the visited LCAS may send a set of determined location data to the home LCAS. Alternatively, the visited LCAS may automatically push such location data to the home LCAS without a query from the home LCAS.

At block 780, the home LCAS utilizes the first and second sets of location data generated by the home access networks, visited LCAS and/or visited access networks to determine the location of the mobile device for one or more time points. To make this determination, the LCAS applies the rules, methods, preferences, priorities, and parameters reflected in the reconciliation process that are applicable to the roaming mobile device.

At block 785, the home LCAS may serve determined location data (and/or received location data) to a location-based service. As one example, the home LCAS may serve determined location data to the first location-based service that initiated tracking of the mobile device. Serving location data to the first location-based service may not be necessary if the first location-based service receives sufficient location information from the visited LCAS. Serving location data to the first location-based service may be necessary, however, if the first location-based service experiences delays when connecting to the visited LCAS after the handoff, is unable to be handed-off to the visited system, or otherwise is permanently or temporarily unable to receive location data from the visited LCAS. Additionally or alternatively, the home LCAS may serve location data to a second location-based service that is different from the first service. For example, even if a mobile device was originally located for the purposes of providing location data to a navigation program, at block 785, the home LCAS may serve determined location data to an asset tracking service or a location-based advertising service. In this way, the home service provider may derive additional value from the location determinations performed by both the home and visited communications systems.

Also at block 785, the home LCAS may store the location data (e.g., location estimates, positioning measurement data, and/or other information) received from home access networks and/or the visited system. Although not shown, blocks 765-785 may be repeated one or more times to determine the location of the mobile device during additional time windows. The process 750 then returns.

FIG. 8 is a logical flow diagram of a process 800 for determining the location of a mobile device when the device was roaming in a visited access network and then returns to a home access network. Before process 800 begins, a mobile device is registered with one or more visited access networks in a visited communications system. When the device is registered with the visited access network, a location-based service requests that a visited LCAS determine and provide the location of the mobile device to the location-based service. For example, while roaming, a user may initiate a navigation application on his mobile device that requests location data from a visited LCAS. In response to this request, the visited LCAS determines the location of the roaming mobile device, serves the determined location information to the location-based service, and/or stores the location data. After the visited LCAS has generated determined location data, the roaming mobile device registers with a home access network instead of the visited access network.

The process 800 begins at block 810, when the home LCAS receives a notification that the previously-roaming mobile device has returned to its home communications system (e.g., from the mobile device or a component of the home communications system, such as the IMS). The home LCAS may relay this notification to a visited LCAS within the visited communications system. The visited LCAS may in turn notify the location-based service of the handoff so that the service may request determined location data from a component of the home communications system (e.g., home LCAS). Alternatively or additionally, the visited LCAS may notify the home LCAS of the ongoing request by the location-based service to receive location data about the mobile device. In this way, the visited LCAS gracefully connects the location-based service to the home LCAS to ensure better location continuity. Alternatively or additionally, the location-based service may detect the change in network and automatically request updated determined location data from the home LCAS on an ongoing basis. In any of these scenarios, as shown at block 820, the home LCAS receives a request from the location-based service to provide determined location data to the service shortly after the mobile device returns to a home access network.

At block 810, the home LCAS may also receive a notification indicating the type of visited access network into which the mobile device roamed, the location determination capabilities of the visited access network, and an indication of the availability of historical location data (e.g., estimated locations and/or positioning measurement data) generated by the visited LCAS and/or visited access networks. For example, the home LCAS may receive an indication from a visited LCAS that the mobile device had roamed into a UMTS network capable of performing only AGPS and OTDOA location estimations, and that recent AGPS and OTDOA location estimates are available.

At block 830, to begin fulfilling the request by the location-based service, the home LCAS specifies a reconciliation process for the mobile device. When generating the reconciliation process, the selection module 402 may use the received information about the visited access network and the availability of historical location data as selection criteria. For example, the selection module may create a reconciliation process that dictates that the home LCAS should obtain the most recent historical AGPS location estimate generated by the visited communications system and utilize this historical location estimate until an AGPS location determination in a home access network has fixed the position of the mobile device with sufficient accuracy. By utilizing historical data from a visited communications system, the home LCAS may improve the TTF, accuracy, cost, and/or yield of its own location determinations and improve location continuity.

At block 840, in accordance with the specified reconciliation process, the home LCAS requests, from the visited LCAS, historical location data (e.g., estimated locations and/or positioning measurement data) generated by the visited LCAS and/or visited access networks. For example, the home LCAS may request that the visited LCAS provide historical AGPS estimated locations for the most recent time points available. The request may be general in nature (e.g., a request for the last available location determination for the roaming mobile device) or more specific (e.g., a request for any AGPS location estimates available for the last minute that the mobile device was roaming in the visited network). The nature of the request may be dictated by the reconciliation process and the capabilities of a visited LCAS to provide rich historical data.

At block 850, the home LCAS receives from the visited LCAS a first set of historical location data (e.g., location estimates and/or positioning measurement data) generated by the visited LCAS and/or visited access networks. Although not shown, the home LCAS may also initiate one or more location estimations in one or more home access networks in accordance with the applicable reconciliation process.

At block 860, the home LCAS receives a second set of location data from one or more home access networks. For example, the home LCAS may receive estimated locations that are generated by a home access network using an AGPS determination method. Although not shown, to improve location continuity, between blocks 850 and 860, the home LCAS may serve historical location data received from the visited LCAS to the requesting location-based service.

At block 870, the home LCAS determines the location of the mobile device using the first and second sets of location data. To make this determination, the home LCAS applies the rules, methods, preferences, priorities, and parameters reflected in the reconciliation process.

At block 880, the home LCAS may serve the determined location to a location-based service. As one example, the home LCAS may serve determined location data to the first location-based service that initiated the tracking of the mobile device. Additionally or alternatively, the home LCAS may serve location data to a second location-based service that is different from the first service. For example, even if a mobile device was originally located for the purposes of providing location data to a navigation program, the home LCAS may serve determined location data to an asset tracking service or a location-based advertising service. Also at block 880, the home LCAS may store the determined location and/or the sets of location data and other information received from home access networks and/or the visited system. Although not shown, as necessary, blocks 860-880 may be repeated one or several times to generate additional determined locations at additional time points. The process 800 then returns.

FIGS. 7A, 7B, and 8 describe how a first LCAS associated with a first communications system and a second LCAS associated with a second communications system exchange location data. However, one having skill in the art will appreciate that in other examples, a first LCAS may directly request location data from and/or exchange location data with other components of a second communications system. For example, a first LCAS may directly request and/or receive information from an access network associated with a second communications system. Moreover, the processes described herein may be utilized across multiple communications systems, such as when a mobile device roams from a first communications system to a second, third, and fourth communication system.

CONCLUSION

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

We claim:

1. A method for providing improved location continuity for a mobile device that roams from a home communications system to a visited communications system, the method comprising:

in response to a request from a location-based service, requesting a location of a mobile device that is accessing a home communications system;

receiving location data generated by one or more home access networks associated with the home communications system;

generating an estimated location of a mobile device using the received location data;

storing the estimated location of the mobile device;

receiving a notification that the mobile device has roamed into a visited access network associated with a visited communications system; and in response to a request for the location of the mobile device, transmitting to the visited communications system the stored estimated location of the mobile device determined by the home communications system.

2. The method of claim 1, further comprising storing the received location data generated by the one or more home access networks.

3. The method of claim 2, further comprising transmitting to the visited communications system the stored location data generated by the one or more home access networks.

4. The method of claim 1, further comprising:

querying the visited communications system for location data regarding the mobile device;

receiving location data from the visited communications system in response to the query; and determining a revised location of the mobile device using the stored location data received from the home communications system and the location data received from the visited communications system.

5. The method of claim 4, further comprising:

receiving an indication of the type of visited access network into which the mobile device has roamed; and based on the received indication, specifying a reconciliation policy that determines how the stored location data received from the home communications system and the location data received from the visited communications system are utilized to determine the revised location of the mobile device.

6. The method of claim 1, further comprising providing the stored estimated location of the mobile device to an emergency location-based service.

7. A location continuity service system for providing improved location continuity for a mobile device that roams from a home communications system to a visited communications system, the location continuity service system comprising:

a request module that, in response to a request from a location-based service, requests a location of a mobile device that is accessing a home communications system;

an analysis module that:

receives location data generated by one or more home access networks associated with the home communications system;

generates an estimated location of a mobile device using the received location data; and stores the estimated location of the mobile device; and a database management module that, in response to a notification that the mobile device has roamed into a visited access network associated with a visited communications system, transmits the stored estimated location of the mobile device to a location continuity service associated with the visited communications system.

8. The system of claim 7, wherein the analysis module further stores the received location data generated by the one or more home access networks.

9. The system of claim 8, wherein the analysis module further transmits to the location continuity service associated with visited communications system the stored location data generated by the one or more home access networks.

10. The system of claim 7, wherein the request module further queries the visited communications system for location data regarding the mobile device, and wherein the analysis module further:

receives location data from the visited communications system in response to the query; and determines a revised location of the mobile device using the stored location data received from the home communications system and the location data received from the visited communications system.

11. The system of claim 10, wherein the analysis module further:

receives an indication of the type of visited access network into which the mobile device has roamed; and based on the received indication, specifies a reconciliation policy that determines how the stored location data received from the home communications system and the location data received from the visited communications system are utilized to determine the revised location of the mobile device.

12. The system of claim 7, wherein the database management module further provides the stored estimated location of the mobile device to an emergency location-based service.

13. A method for providing improved location continuity for a mobile device that roams from a visited communications system to a home communications system, the method comprising:

receiving a request from a location-based service for location information relating to a mobile device that has returned to a home access network in a home communications system after roaming within a visited access network in a visited communications system;

requesting location data related to the mobile device from the visited communications system;

requesting location data related to the mobile device from the home communications system;

receiving a first set of location data related to the mobile device from the visited communications system;

receiving a second set of location data related to the mobile device from one or more home access networks in the home communications system; and estimating the location of the mobile device using the first set of location data and the second set of location data.

14. The method of claim 13, further comprising:

receiving information about the type of visited access network within which the mobile device roamed; and using the received information to determine how the first set of location data should be utilized with the second set of location data to estimate the location of the mobile device.

15. The method of claim 13, further comprising providing the estimated location of the mobile device to an emergency location-based service.

16. The method of claim 13, further comprising providing to a location-based service an estimated location of the mobile device based on the first set of location data received from the visited communications system, prior to receiving the second set of location data from one or more home access networks.

17. A system for providing improved location continuity for a mobile device that roams from a visited communications system to a home communications system, the system comprising:

a request module that receives a request from a location-based service for location information relating to a mobile device that has returned to a home access network in a home communications system after roaming within a visited access network in a visited communications system, and, in response to the received request, requests location data related to the mobile device from the visited communications system and from the home communications system; and an analysis module that:
receives a first set of location data related to the mobile device from the visited communications system and a second set of location data related to the mobile device from one or more home access networks in the home communications system; and
estimates the location of the mobile device using the first set of location data and the second set of location data.

18. The system of claim 17, wherein the analysis module further:
receives information about the type of visited access network within which the mobile device roamed; and
uses the received information to determine how the first set of location data should be utilized with the second set of location data to estimate the location of the mobile device.

19. The system of claim 17, further comprising a database management module that provides the estimated location of the mobile device to an emergency location-based service.

20. The method of claim 17, further comprising a database management module that provides to a location-based service an estimated location of the mobile device based on the first set of location data received from the visited communications system, prior to receiving the second set of location data from one or more home access networks.

21. The method of claim 1, wherein the method is implemented at a Location Continuity Application Server (LCAS) configured to maintain positioning measurement data and estimated location data generated by a plurality of access networks.

22. The system of claim 7, wherein the system is a Location Continuity Application Server (LCAS) configured to maintain positioning measurement data and estimated location data generated by a plurality of access networks.

23. The method of claim 13, wherein the method is implemented at a Location Continuity Application Server (LCAS) configured to maintain positioning measurement data and estimated location data generated by a plurality of access networks.

24. The system of claim 17, wherein the system is a Location Continuity Application Server (LCAS) configured to maintain positioning measurement data and estimated location data generated by a plurality of access networks.

* * * * *